US007884972B2

(12) United States Patent
Morikawa et al.

(10) Patent No.: US 7,884,972 B2
(45) Date of Patent: Feb. 8, 2011

(54) IMAGE PROCESSING APPARATUS CAPABLE OF HANDLING IMAGE FILE STORED IN ANOTHER APPARATUS, IMAGE PROCESSING SYSTEM, AND IMAGE PROCESSING METHOD

(75) Inventors: Takeshi Morikawa, Takarazuka (JP); Nobuo Kamei, Amagasaki (JP); Masayuki Yoshii, Sakai (JP); Takeshi Minami, Amagasaki (JP); Kei Shigehisa, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 987 days.

(21) Appl. No.: 11/727,621

(22) Filed: Mar. 27, 2007

(65) Prior Publication Data

US 2008/0137441 A1 Jun. 12, 2008

(30) Foreign Application Priority Data

Dec. 8, 2006 (JP) .............................. 2006-332083

(51) Int. Cl.
*H04N 1/00* (2006.01)
*G06F 12/00* (2006.01)
(52) U.S. Cl. ................. 358/426.05; 358/1.16; 711/154; 711/6

(58) Field of Classification Search ....................... None
See application file for complete search history.

(56) References Cited

U.S. PATENT DOCUMENTS

| 2003/0020949 | A1* | 1/2003 | Goto ........................ 358/1.15 |
| 2004/0190073 | A1* | 9/2004 | Kato et al. .................. 358/400 |
| 2009/0113124 | A1* | 4/2009 | Kataoka et al. ............. 711/112 |

FOREIGN PATENT DOCUMENTS

| JP | 2001-077992 | 3/2001 |
| JP | 2006-211092 | 8/2006 |
| JP | 2006-319919 | 11/2006 |

OTHER PUBLICATIONS

Japanese Office Action mailed on Dec. 16, 2008 directed towards counterpart application No. 2006-332083; 6 pages.

* cited by examiner

*Primary Examiner*—Than Nguyen
(74) *Attorney, Agent, or Firm*—Morrison & Foerster LLP

(57) ABSTRACT

According to an image processing apparatus, if image data designated to be stored in a storage unit within the image processing apparatus is stored in a storage device outside the image processing apparatus, a memory remaining amount or the like of the image processing apparatus is calculated as if the image data is stored in a storage area within the image processing apparatus, although the image data is not moved to the storage area within the image processing apparatus.

20 Claims, 13 Drawing Sheets

IMAGE PROCESSING APPARATUS CAPABLE OF HANDLING IMAGE FILE STORED IN ANOTHER APPARATUS, IMAGE PROCESSING SYSTEM, AND IMAGE PROCESSING METHOD

This application is based on Japanese Patent Application No. 2006-332083 filed with the Japan Patent Office on Dec. 8, 2006, the entire content of which is hereby incorporated by reference.

BACKGROUND OF THE INVENTION

1. Field of the Invention

The present invention relates to an image processing apparatus and an image processing system, and more particularly to an image processing apparatus handling an image file, the image file itself being stored in another apparatus or the like, and an image processing system including such an image processing apparatus.

2. Description of the Related Art

Transfer of data including image data has conventionally been carried out among a plurality of apparatuses connected to a network.

For example, Japanese Laid-Open Patent Publication No. 2003-046705 (Patent Document 1) discloses a technique applicable to an image processing apparatus, to erase image data after transfer of the image data to a predetermined external terminal device that is carried out when a set retention period of the image data stored in the image processing apparatus has elapsed.

In addition, Japanese Laid-Open Patent Publication No. 2000-057314 (Patent Document 2) discloses a technique to manage image data stored in another equipment connected to a network based on its link information, in equipment connected to the network, in order to avoid redundant storage of identical image data in a plurality of pieces of equipment connected to the network.

As described in Patent Document 2 above, however, if image data is managed by using link information, inconvenience has been caused in some cases, for example, in a case where setting of upper limit of storage capacity for each user is attempted or a case where charging in accordance with the used storage capacity is attempted. More specifically, if a plurality of users attempt to store the identical image data in storage devices they own, the image data itself is stored in a storage device owned by one user, while link information of that image data is stored in a storage device owned by another user. In such a case, although an attempt to store the identical image data is made, an amount of data used for that image data is different among users, and it is considered as unfair in terms of charging or upper limit management of the storage capacity.

SUMMARY OF THE INVENTION

The present invention was made in view of such circumstances. An object of the present invention is to provide an image processing apparatus and an image processing system enabling management of a storage capacity or the like as if the image data itself is stored, even though image data is managed based on link information.

An image processing apparatus according to one aspect of the present invention includes: a data storage unit storing image data; a communication unit communicating with a storage device different from the data storage unit; a stored data designation unit designating image data to be stored in the data storage unit; a first information storage unit storing information for identifying designated data which is image data designated by the stored data designation unit; a second information storage unit storing the information for identifying each designated data in association with a data amount of the designated data and an area where the designated data is stored; a storage control unit obtaining information for specifying the data amount of the designated data from the data storage unit and storing that information in the second information storage unit if the area where the designated data is stored is the data storage unit, and obtaining information for specifying the data amount of the designated data from the storage device and storing that information in the second information storage unit if the area where the designated data is stored is the storage device; a calculation unit calculating a virtual used amount based on the data amount of all the designated data for which information for specifying the data amount has been stored in the second information storage unit; and a display unit displaying the virtual used amount calculated by the calculation unit as a used amount of the data storage unit.

An image processing apparatus according to another aspect of the present invention is directed to an image processing apparatus calculating a charged amount in accordance with an amount of data storage, and the image processing apparatus includes: a data storage unit storing image data; a communication unit communicating with a storage device different from the data storage unit; a stored data designation unit designating image data to be stored in the data storage unit; a first information storage unit storing information for identifying designated data which is image data designated by the stored data designation unit; a second information storage unit storing the information for identifying each designated data in association with a data amount of the designated data and a storage location of the designated data; a storage control unit obtaining information for specifying the data amount of the designated data from the data storage unit and storing that information in the second information storage unit if the designated data is stored in the data storage unit, and obtaining information for specifying the data amount of the designated data from the storage device and storing that information in the second information storage unit if the storage location of the designated data is the storage device; a first calculation unit calculating a virtual used capacity based on the data amount of all the designated data of which data amount has been stored in the second information storage unit; and a second calculation unit calculating a charged amount for usage of the data storage unit based on the virtual used capacity calculated by the calculation unit.

An image processing apparatus according to yet another aspect of the present invention is directed to an image processing apparatus performing management of upper limit of a storage capacity of data, and the image processing apparatus includes: a data storage unit storing image data; a communication unit communicating with a storage device different from the data storage unit; a stored data designation unit designating image data to be stored in the data storage unit; a first information storage unit storing information for identifying designated data which is image data designated by the stored data designation unit; a second information storage unit storing the information for identifying each designated data in association with a data amount of the designated data and a storage location of the designated data; a storage control unit obtaining information for specifying the data amount of the designated data from the data storage unit and storing that information in the second information storage unit if the storage location of the designated data is the data storage unit, and obtaining information for specifying the data amount of the designated data from the storage device and storing that information in the second information storage unit if the storage location of the designated data is the storage device; a first calculation unit calculating a virtual used capacity of the data storage unit based on the data amount of all the designated data of which data amount has been stored in the second information storage unit; a second calculation unit calculating a difference between a capacity and the virtual used capacity of the data storage unit; and a display unit displaying the difference in capacity calculated by the second calculation unit as a remaining amount of the storage capacity of the data storage unit.

An image processing system according to the present invention is directed to an image processing system including an image processing apparatus having a data storage unit storing image data, and the image processing apparatus further includes: a first information storage unit storing information for identifying the image data; a second information storage unit storing information for identifying the image data stored in the data storage unit and information for identifying a storage device other than the data storage unit for storing link information of the image data, in association with each other; a designation unit designating deletion of the image data stored in the data storage unit; and a storage control unit that, if the designation unit designates deletion of the image data, deletes the information for identifying the designated image data from the first information storage unit without deleting the image data from the data storage unit when the information for identifying the storage device with regard to the designated image data is stored in the second information storage unit, and deletes the image data from the data storage unit and deletes the information for identifying the designated image data from the first information storage unit when the information for identifying the storage device with regard to the designated image data is not stored in the second information storage unit.

A method of controlling an image processing apparatus according to one aspect of the present invention is directed to a method of controlling an image processing apparatus including a data storage unit storing image data and communicating with a storage device different from the data storage unit, and the method includes the steps of: designating image data to be stored in the data storage unit; storing information for identifying designated data which is the designated image data; storing the information for identifying each designated data in association with a data amount of the designated data and an area where the designated data is stored; detecting an area where the designated data is stored; obtaining information for specifying the data amount of the designated data from the data storage unit and storing that information if the area where the designated data is stored is the data storage unit, and obtaining information for specifying the data amount of the designated data from the storage device and storing that information if the area where the designated data is stored is the storage device; calculating a virtual used amount based on the data amount of all the designated data for which information for specifying the data amount has been stored; and displaying the calculated virtual used amount as a used amount of the data storage unit.

A method of controlling an image processing apparatus according to another aspect of the present invention is directed to a method of controlling an image processing apparatus including a data storage unit storing image data, communicating with a storage device different from the data storage unit, and calculating a charged amount in accordance with an amount of data storage, and the method includes the steps of: designating image data to be stored in the data storage unit; storing information for identifying designated data which is the designated image data; storing the information for identifying each designated data in association with a data amount of the designated data and a storage location of the designated data; determining an area where the designated data is stored; obtaining information for specifying the data amount of the designated data from the data storage unit and storing that information if the designated data is stored in the data storage unit, and obtaining information for specifying the data amount of the designated data from the storage device and storing that information if the designated data is stored in the storage device; calculating a virtual used capacity based on the data amount of all the designated data of which data amount has been stored; and calculating a charged amount for usage of the data storage unit based on the calculated virtual used capacity.

A method of controlling an image processing apparatus according to yet another aspect of the present invention is directed to a method of controlling an image processing apparatus including a data storage unit storing image data, communicating with a storage device different from the data storage unit, and performing management of upper limit of a storage capacity of data, and the method includes the steps of: designating image data to be stored in the data storage unit; storing information for identifying designated data which is the designated image data; storing the information for identifying each designated data in association with a data amount of the designated data and a storage location of the designated data; detecting an area where the designated data is stored; obtaining information for specifying the data amount of the designated data from the data storage unit and storing that information if the area where the designated data is stored is the data storage unit, and obtaining information for specifying the data amount of the designated data from the storage device and storing that information if the area where the designated data is stored is the storage device; calculating a virtual used capacity of the data storage unit based on the data amount of all the designated data of which data amount has been stored; calculating a difference between a capacity and the virtual used capacity of the data storage unit; and displaying the calculated difference in capacity as a remaining amount of the storage capacity of the data storage unit.

According to the present invention, as to the image data stored in the external storage device among the image data designated by the user to be stored in the storage unit (data storage unit) included in the image processing apparatus, the storage location (link information) thereof is stored in the storage unit within the image processing apparatus. Thus, in the image processing apparatus, it is not necessary to store therein all the image data designated to be stored in that image processing apparatus. Therefore, the storage capacity required in the image processing apparatus can be suppressed and the amount of data communicated over the network can also be reduced.

In addition, according to the present invention, with regard to the image processing apparatus, the amount of data occupying the storage area within the image processing apparatus, the charged amount based on the data amount, or the remaining amount of the storage capacity of data storage means are provided based on the data amount of all image data designated for the purpose of storage or the like in the image processing apparatus. Thus, even if the image data is managed based on the link information in the image processing apparatus and the image processing system, the used amount of the data amount, the charged amount, or the remaining amount of the storage capacity is determined based not on the data amount of the link information but on the amount of actual image data. Therefore, in managing the storage capacity and the like, management similar to that in storage of the image data itself can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An image forming apparatus representing one embodiment of an image processing apparatus according to the present invention and a file share system representing one embodiment of an image processing system according to the present invention will be described hereinafter with reference to the drawings.

Figure 1:
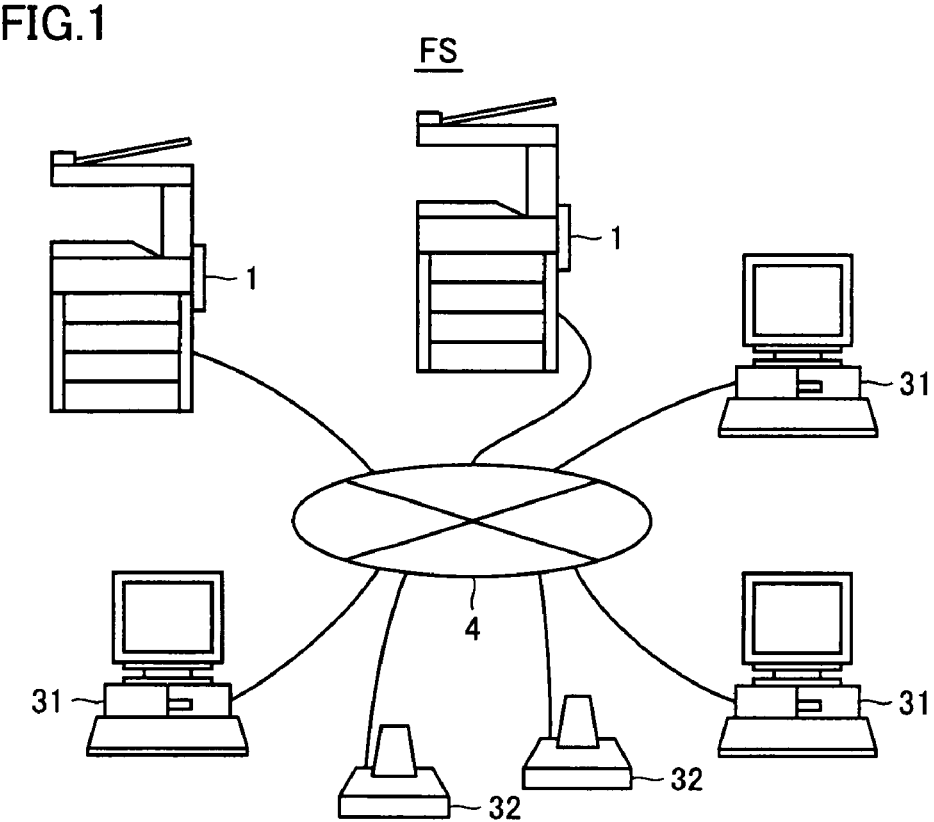
FIG. 1 illustrates an example of an overall configuration of a file share system FS.

Referring to FIG. 1, a file share system FS is configured with one or a plurality of image forming apparatus(es) 1, one or a plurality of personal computer(s) (hereinafter, abbreviated as "PC") 31, one or a plurality of FAX terminal(s) 32, a communication line 4, and the like. Computer names such as "PC001", "PC002", and so on are allocated to image forming apparatus 1 and each PC 31 as identification information. Instead of such a computer name, an IP (Internet Protocol) address may be used as the identification information. A telephone number for what is called a fixed-line telephone or an IP telephone is allocated to each FAX terminal 32.

Image forming apparatus 1, each PC 31 and each FAX terminal 32 can be connected to one another through communication line 4. LAN (Local Area Network), the Internet, a leased circuit, a public circuit, or the like is used as communication line 4. As communication protocol or communication standards, TCP/IP (Transmission Control Protocol/Internet Protocol), FTP (File Transfer Protocol), POP3 (Post Office Protocol version 3), SMTP (Simple Mail Transfer Protocol), IPP (Internet Printing Protocol), IEEE 802.3 representing the standards for wired LAN, IEEE (Institute of Electrical and Electronic Engineers) 802.11 representing the standards for wireless LAN, G3 (Group 3) or G4 (Group 4) standards for FAX, or the like is used.

According to file share system FS, the user can share data stored in the hard disk of image forming apparatus 1 between image forming apparatus 1 and PC 31. Instead of PC 31, a workstation, a PDA (Personal Digital Assistant), a portable telephone terminal, or the like may be used.

Image forming apparatus 1 is an apparatus attaining integrated functions of copy, network printing, a scanner, a FAX, a document server, and the like. Image forming apparatus 1 may also be referred to as a multi-function machine or an MFP (Multi Function Peripherals).

Figure 2:
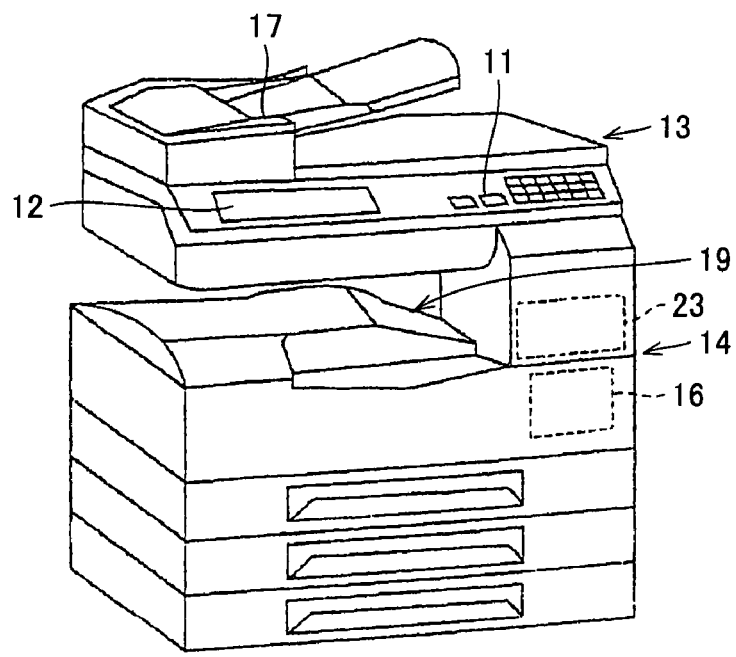
FIG. 2 shows appearance of an image forming apparatus in FIG. 1.
Figure 3:
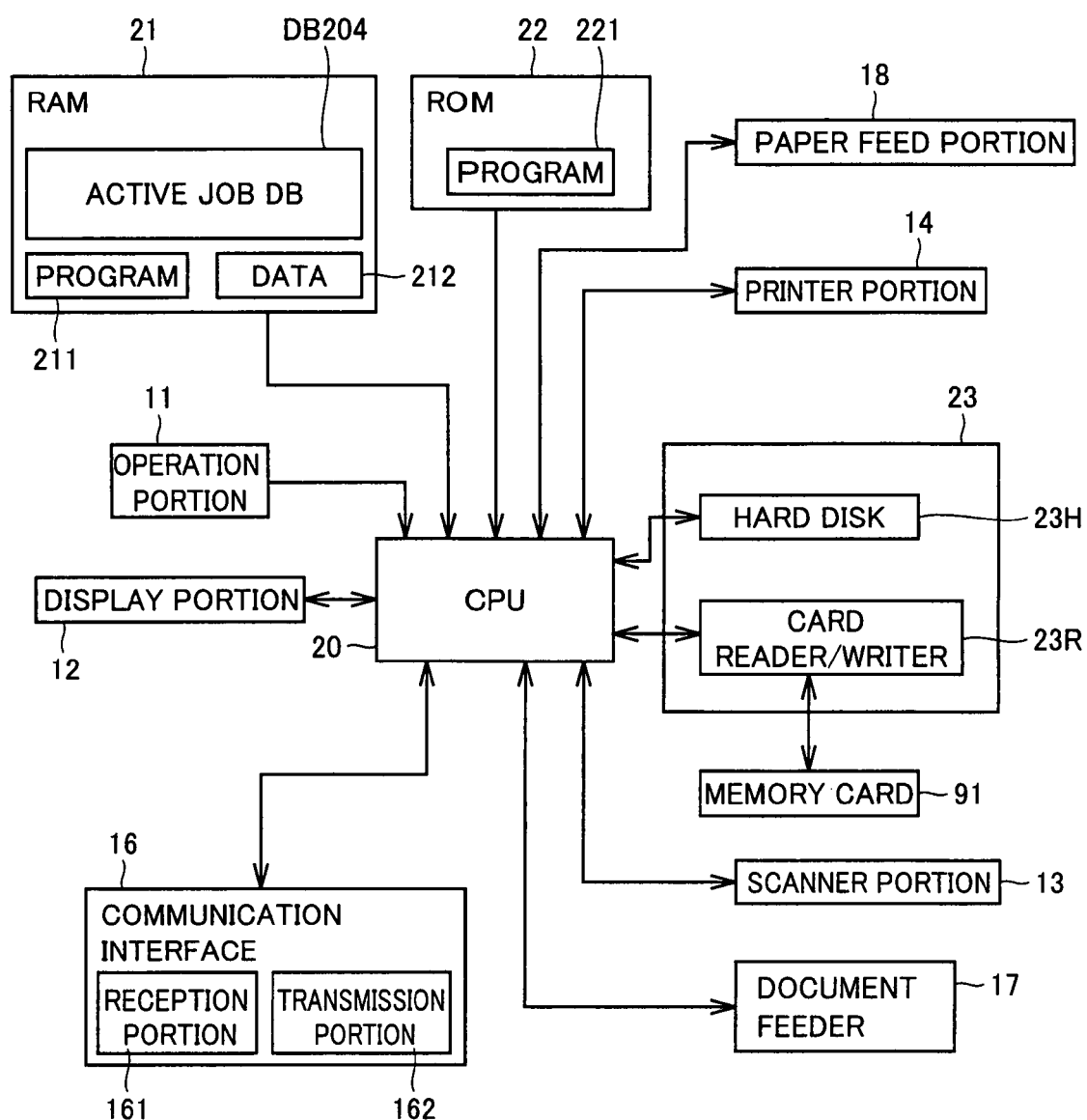
FIG. 3 illustrates an example of a hardware configuration of the image forming apparatus in FIG. 2.

As can be seen from FIG. 2 showing appearance and from FIG. 3 showing the hardware configuration, image forming apparatus 1 is constituted of an operation portion 11, a display portion 12, a scanner portion 13, a printer portion 14, a communication interface 16, a document feeder 17, a paper feed portion 18, a paper output tray 19, a CPU (Central Processing Unit) 20, an RAM (Random Access Memory) 21, an ROM (Read Only Memory) 22, a data storage unit 23, and the like.

Operation portion 11 is constituted of a plurality of keys for input of numbers, characters, signs, and the like, a sensor recognizing a pressed key, a transmission circuit transmitting a signal indicating the recognized key to CPU 20, and the like.

Display portion 12 displays a screen for giving a message or an instruction to the user, a screen allowing the user to input setting contents and processing contents, a screen showing an image formed in image forming apparatus 1 and a result of processing, and the like. In the present embodiment, a touch panel is used as display portion 12. Therefore, display portion 12 attains a function to sense a position on the touch panel touched by the user's finger and to transmit a signal indicating the result of sensing to CPU 20.

Thus, operation portion 11 and display portion 12 serve as a user interface (a user interface 100 which will be described later) for allowing the user to directly operate image forming apparatus 1. It is noted that an application program and a driver for providing an instruction to image forming apparatus 1 are installed in PC 31. Therefore, the user can also use PC 31 to remotely operate image forming apparatus 1.

Scanner portion 13 photoelectrically reads an image such as a photograph, a character, a drawing, a chart, and the like on a document and generates digital image data (herein, density data representing RGB or black density). The image data obtained in this manner is used for printing in printer portion 14. Alternatively, the image data is converted to a file in such a format as TIFF (Tagged Image File Format) or PDF (Portable Document Format), and stored in data storage unit 23 or transmitted to PC 31. Further alternatively, the image data is converted to FAX data and transmitted to FAX terminal 32. Document feeder 17 is provided in an upper portion of a main body of image forming apparatus 1, and used for successively feeding one or a plurality of document(s) to scanner portion 13.

Printer portion 14 prints an image read by scanner portion 13, an image of image data transmitted from PC 31, or an image of FAX data transmitted from FAX terminal 32 on a recording sheet such as a sheet of paper or a film. Paper feed portion 18 is provided in a lower portion of the main body of image forming apparatus 1, and used for supplying the recording sheet, suitable for the image to be printed, to printer portion 14. The recording sheet on which the image has been printed by printer portion 14, namely, a printed matter, is output to paper output tray 19.

Communication interface 16 is constituted of a transmission portion, a reception portion, and the like, and serves as an apparatus for communicating data with PC 31 and FAX terminal 32. An NIC (Network Interface Card), a modem, a TA (Terminal Adapter), or the like is used as communication interface 16.

Data storage unit 23 has a hard disk 23H, a card reader/writer 23R, and the like. Card reader/writer 23R reads/writes data from/to a memory card 91 such as a compact flash (trademark) or a smart media. Memory card 91 is mainly used for communication of data with PC 31 without using communication line 4, or for back-up of data.

Figure 4:
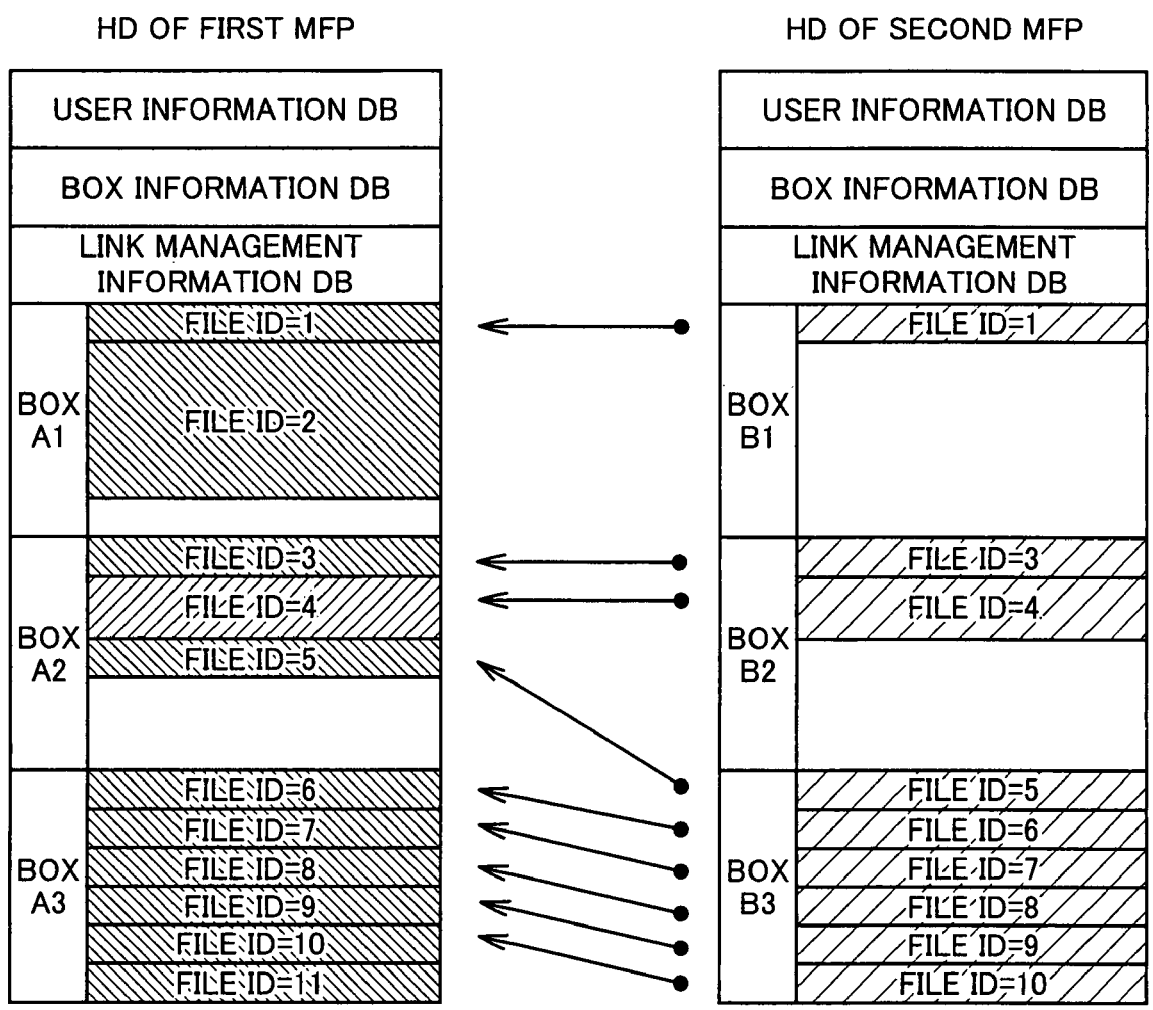
FIG. 4 schematically shows a manner of storage of information within a hard disk of the image forming apparatus in FIG. 2.

FIG. 4 is a diagram schematically showing a manner of storage of information in hard disk 23H. It is noted that image forming apparatus 1 can operate as if the image data stored in another apparatus is stored in image forming apparatus 1, without actually storing the image data in image forming apparatus 1 but by storing link information thereof Here, in order to clarify such a feature, FIG. 4 shows a manner of storage of information in the hard disks of two image forming apparatuses 1 ("first MFP" and "second MFP" in FIG. 4).

Each hard disk 23H includes a plurality of BOXes (hereinafter, also referred to as a "box" as appropriate). Initially, three BOXes store user information DB (database), BOX information DB and link management information DB, respectively. In addition, the hard disk of the first MFP further includes BOXes A1 to A3, and the hard disk of the second MFP further includes BOXes B1 to B3.

BOXes A1 to A3 and B1 to B3 represent image accumulation areas on hard disk 23H (of image forming apparatus 1 shown as the first MFP or the second MFP) allocated to each user. Individual BOXes are provided with numbers specific to the apparatus, so as to be distinguished also from other image forming apparatuses. In the present embodiment, a user name of a user who owns each BOX is used as the name of the BOX.

In addition, the image data in each BOX is managed for each job, and each image file in each BOX is managed by using an identifier called FILE ID. The user can save the image data in the box within image forming apparatus 1, by carrying out file transfer from PC 31 (by operating PC 31). Alternatively, memory card 91 where the image data has been saved is set in a slot of card reader/writer 23R followed by file copy, so that the image data can be saved in the box. Additionally, the image can be saved in the box also in the following cases.

For example, if the user instructs copy of the document set on document feeder 17, image forming apparatus 1 saves the image data of the image read from the document in the user's box. Alternatively, when an instruction to transmit the image data of the image of the document set on document feeder 17 to PC 31 is issued as well, similarly, the image data of the read image is saved in each user's box. If the user instructs printing of the document from PC 31 (network printing), the image data of the document transmitted from PC 31 is saved in the box owned by the user. If FAX data is transmitted from FAX terminal 32, the FAX data is saved in the box owned by the user who is a receiver. If an instruction to transmit the image of the document set on document feeder 17 to FAX terminal 32 is issued, the image data of the read image is saved in the box owned by the user who has issued the instruction.

FIG. 4 shows that, in the first MFP, the image data of FILE IDs "1" and "2" is stored in BOX A1, the image data of FILE IDs "3" to "5" is stored in BOX A2, and the image data of FILE IDs "6" to "11" is stored in BOX A3.

In addition, FIG. 4 shows that, in the second MFP, link information of FILE ID "1" (information for identifying BOX A1, where image data of FILE ID "1" is actually stored, as a storage location) is stored in BOX B1, link information of FILE IDs "3" and "4" (information for identifying BOX A2, where image data of FILE ID "3" is actually stored, as the storage location and information for identifying BOX A2, where image data of FILE ID "4" is actually stored, as the storage location) is stored in BOX B2, and link information of FILE IDs "5" to "10" (information for identifying BOX A2, where image data of FILE ID "5" is actually stored, as the storage location and information for identifying BOX A3, where image data of FILE IDs "6" to "10" is actually stored, as the storage location) is stored in BOX B3. It is noted that an arrow in FIG. 4 shows association of BOXes with each other based on the link information stored in each BOX B1 to B3.

Individual databases will be described hereinafter.

Table 1 shows an example of a manner of storage of information in user information DB.

TABLE 1

| User Name | BOX Number |
|---|---|
| MORIKAWA | A1 |
| TANAKA | A2 |
| INOUE | A3 |
| ... | ... |

Referring to Table 1, user information DB stores information related to the user using image forming apparatus 1. The "user name" represents identification information for identifying each user. The user name is used as a target BOX when the user uses image forming apparatus 1 or as destination information when the user transmits an image to other users.

Table 2 shows an example of a manner of storage of information in BOX information DB.

TABLE 2

| BOX Number | Upper Limit | Valid Image FILE ID | Invalid Image FILE ID | Retention Period | Memory Remaining Amount | Charge Rank |
|---|---|---|---|---|---|---|
| A1 | 1200 MB | 1, 2 | None | 1 day | 17% | 2 |
| A2 | 1200 MB | 3, 5 | 4 | 2 days | 67% | 1 |
| A3 | 1200 MB | 6, 7, 8, 9, 10, 11 | None | 1 day | 0% | 2 |
| B1 | 1200 MB | 1 | None | 2 days | 83% | 1 |
| B2 | 1200 MB | 3, 4 | None | 2 days | 58% | 1 |

TABLE 2-continued

| BOX Number | Upper Limit | Valid Image FILE ID | Invalid Image FILE ID | Retention Period | Memory Remaining Amount | Charge Rank |
|---|---|---|---|---|---|---|
| B3 | 1200 MB | 5, 6, 7, 8, 9, 10 | None | 3 days | 0% | 2 |
| ... | ... | ... | ... | ... | ... | ... |

Referring to Table 2, BOX information DB stores information for each BOX of image forming apparatus 1.

The "upper limit" represents information for identifying an upper limit value (accumulation capacity) of each BOX.

The "valid image FILE ID" represents information for identifying the image data for which the owner has performed an operation for storage in each BOX, and represents a FILE ID of the image data required for display of a memory remaining amount, charge management, and upper limit management.

The "invalid image FILE ID" represents a FILE ID of the image data not used for display of a memory remaining amount, charge management, and upper limit management, among image data actually stored in each BOX.

The "retention period" represents a period during which the image is retained, from registration of the image in each BOX until automatic deletion thereof.

The "memory remaining amount" is representation in percentage of a remaining amount of a virtual storage capacity of each BOX, that is found based on a file size of the image data identified by the valid FILE ID of each BOX and a data amount shown in the "upper limit". The "charge rank" represents a charge rank of the image data identified by the valid FILE ID of each BOX. The "memory remaining amount" and the "charge rank" will be described in detail later.

Referring to FIG. 4, the image data of FILE IDs "1" and "2" is actually stored in BOX A1. In addition, referring to Table 2, "1" and "2" are stored as the valid image FILE ID of BOX A1. Thus, BOX A1 is in such a state that storage of all image data actually stored in BOX A1 has been designated by the user who owns this BOX.

Referring again to FIG. 4, BOX A2 actually stores three image files of FILE IDs "3", "4" and "5". On the other hand, referring to Table 2, in BOX A2, there are only valid FILE IDs "3" and "5". Namely, BOX A2 is in such a state that, among the image data actually stored in BOX A2, storage of the image data having FILE IDs "3" and "5" in BOX A2 has been designated by the user who owns this BOX, while deletion of the image data having FILE D "4" has been designated, although storage thereof has once been designated. Thus, in BOX A2, "4" is stored in the field of invalid image FILE ID.

Table 3 shows an example of a manner of storage of information in link management information DB.

TABLE 3

| FILE ID | Location of Image File Itself | Linked Location | Time of Deletion | File Name | Image Size |
|---|---|---|---|---|---|
| 1 | A1 | B1 | 2006/6/21 9:00 | Aaa.txt | 200 MB |
| 2 | A1 | None | 2006/6/22 11:00 | Boox1.xls | 800 MB |
| 3 | A2 | B2 | 2006/6/22 12:00 | Func1.txt | 200 MB |
| 4 | A2 | B2 | 2006/6/22 15:00 | Func2.txt | 300 MB |
| 5 | A2 | B3 | 2006/6/22 17:00 | Control1.doc | 200 MB |
| ... | ... | ... | ... | ... | ... |

Referring to Table 3, link management information DB stores information on each image data in association with FILE ID.

The "location of image file itself" represents information for identifying the BOX where the image data is actually present (stored).

The "linked location" represents information for identifying the BOX where the link information of the image data is managed (the link information is stored), although the image data is not actually stored.

The "time of deletion" represents a scheduled time at which the image data is deleted from the BOX where it is stored. The time of deletion is registered at the time point when the image data is accumulated for the first time. In addition, in the case that the image data is transferred to another BOX, if the retention period in the BOX which is the transfer destination is longer, the time of deletion is automatically updated in accordance with the retention period in the BOX as the transfer destination. Here, the retention period is assumed, for example, as a certain time period from the time point of storage of the image file itself or the link information of the image data, that has been determined in advance for each BOX.

The "file name" is a name for identifying each image data, and it is input by the user when the image data is saved for the first time.

The "image size" represents a capacity actually occupied in hard disk 23H by each image data itself (not the link information), and the size is used for display of a BOX status which will be described later.

Referring back to FIG. 3, ROM 22 stores a program and data for attaining a basic function of image forming apparatus 1, such as reading (scanning) of the image, duplication (copying) of a document, transmission/reception of FAX data, network printing, a document server (box function), and the like. In addition, ROM 22 also stores a program and data for attaining each function of a job generation unit 101, a job execution control unit 102, a user authentication unit 103, a BOX control processing unit 104, a BOX status management unit 105, and the like (see FIG. 5). A part or all of these programs or data may be installed in data storage unit 23. In such a case, the program or the data installed in data storage unit 23 may be loaded to RAM 21 as required. Alternatively, a part or all of these functions may be attained by a processor (circuit).

RAM 21 temporarily stores data transmitted from PC 31 or FAX terminal 32, data to be transmitted to PC 31 or FAX terminal 32, data generated by scanner portion 13, and the like. A non-volatile RAM may be used as RAM 21.

In addition, RAM 21 stores an active job DB 204. Active job DB 204 stores information on processing (job) waiting for execution. Namely, active job DB 204 is information on queue, associated, for each job, with FILE ID described previously in connection with FIG. 4, and active job DB 204 executes the job in the order of registration.

CPU 20 executes a program stored in ROM 22 or a program loaded to RAM 21 and controls overall image forming apparatus 1.

Figure 5:
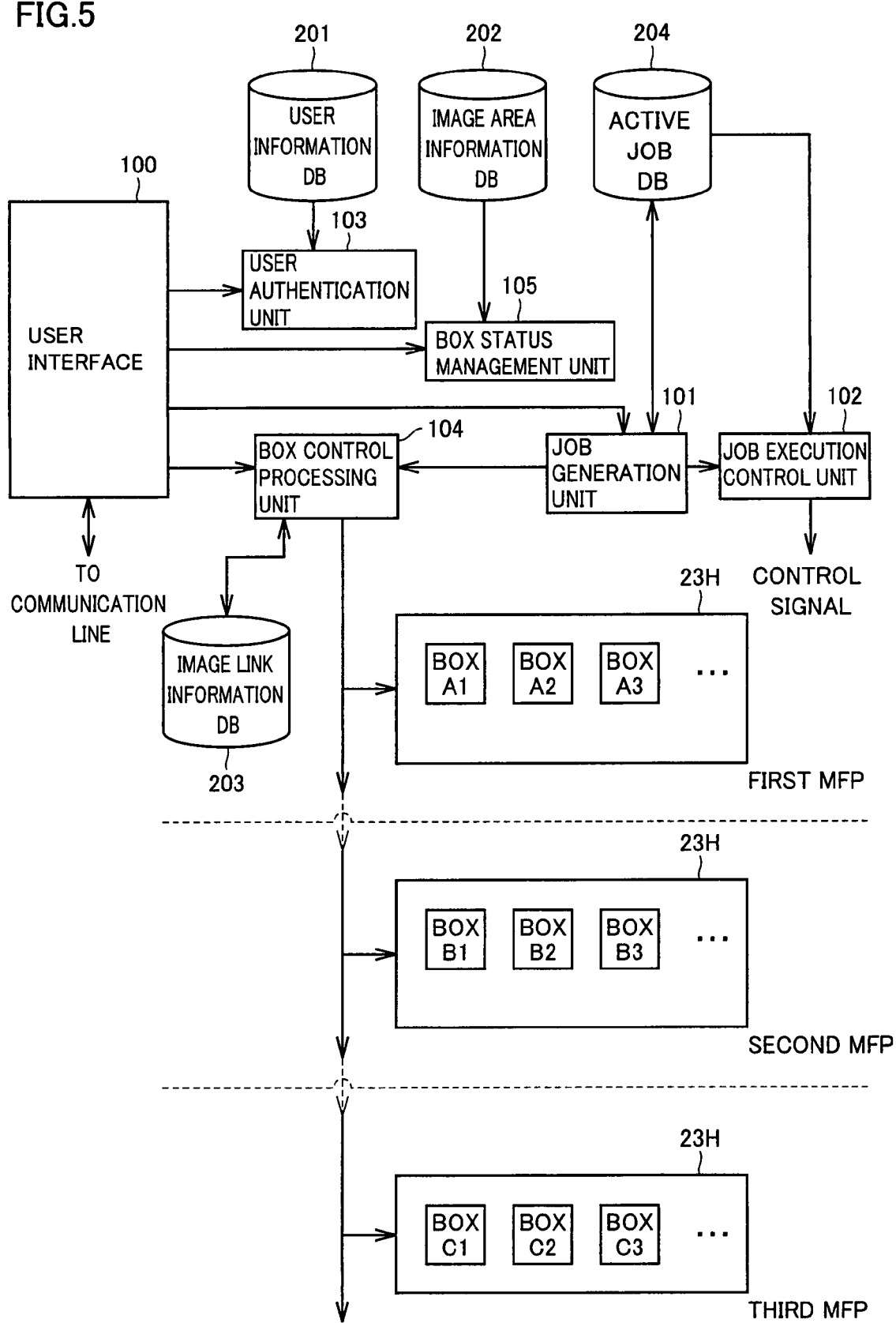
FIG. 5 illustrates a functional configuration of the image forming apparatus in FIG. 1.

FIG. 5 shows an example of a functional configuration of image forming apparatus 1.

Referring to FIG. 5, in image forming apparatus 1, operation portion 11, scanner portion 13, communication interface 16, and the like attain a function as user interface 100.

Job generation unit 101 performs processing for input of image of image data obtained through scanning processing by scanner portion 13, printing data transmitted from PC 31, or FAX data transmitted from FAX terminal 32.

BOX control processing unit 104 performs processing for saving the input image data in a prescribed box (box owned by the user who has input the image).

Job execution control unit 102 controls each unit in image forming apparatus 1 so that the job is executed in accordance with the queue in active job DB 204.

User information authentication unit 103 manages the user name and the BOX name based on a user information DB 201.

Figure 6:
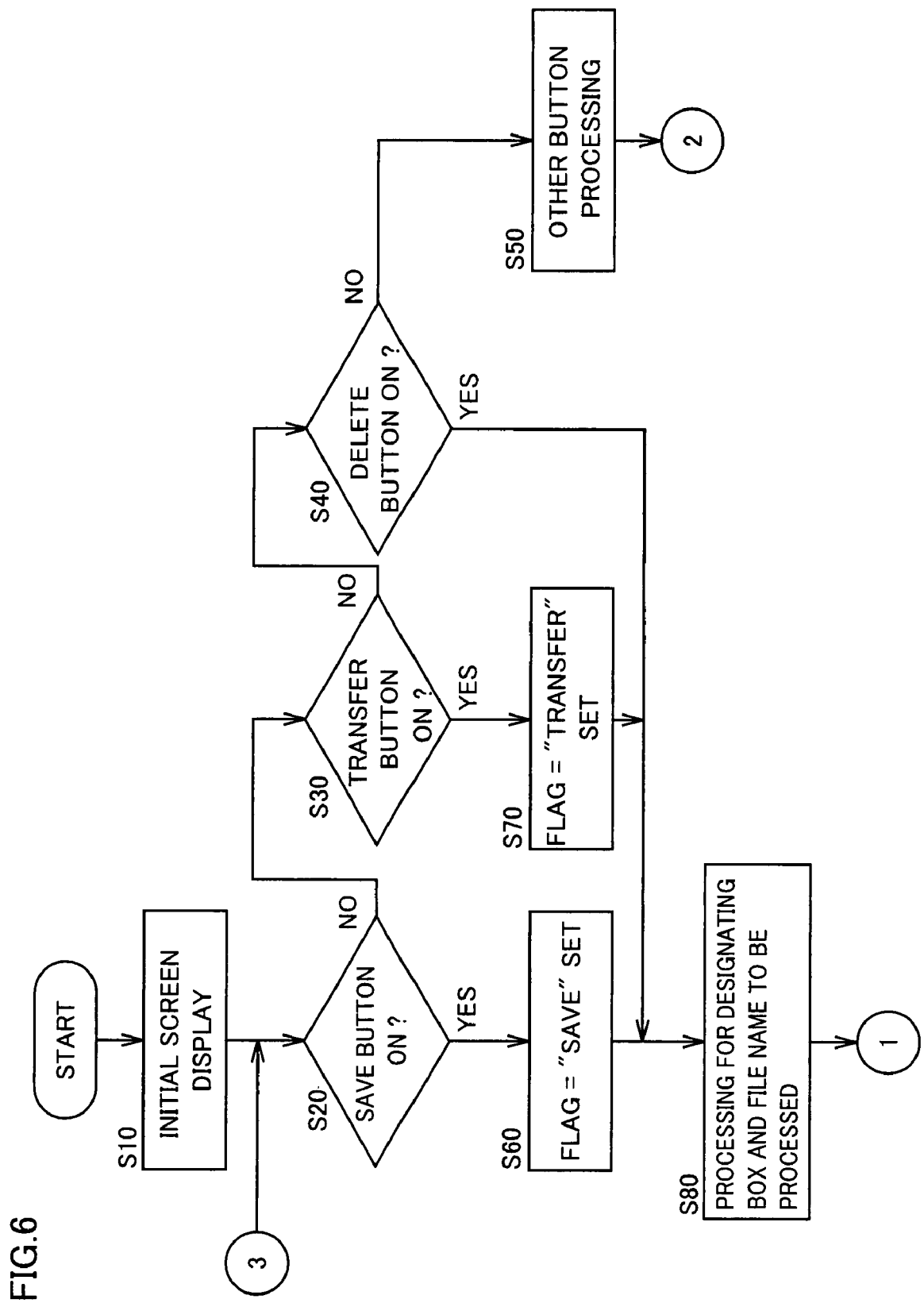
FIGS. 6 and 7 are flowcharts illustrating processing for data saving in a box, transfer and deletion executed in the image forming apparatus in FIG. 2.
Figure 7:
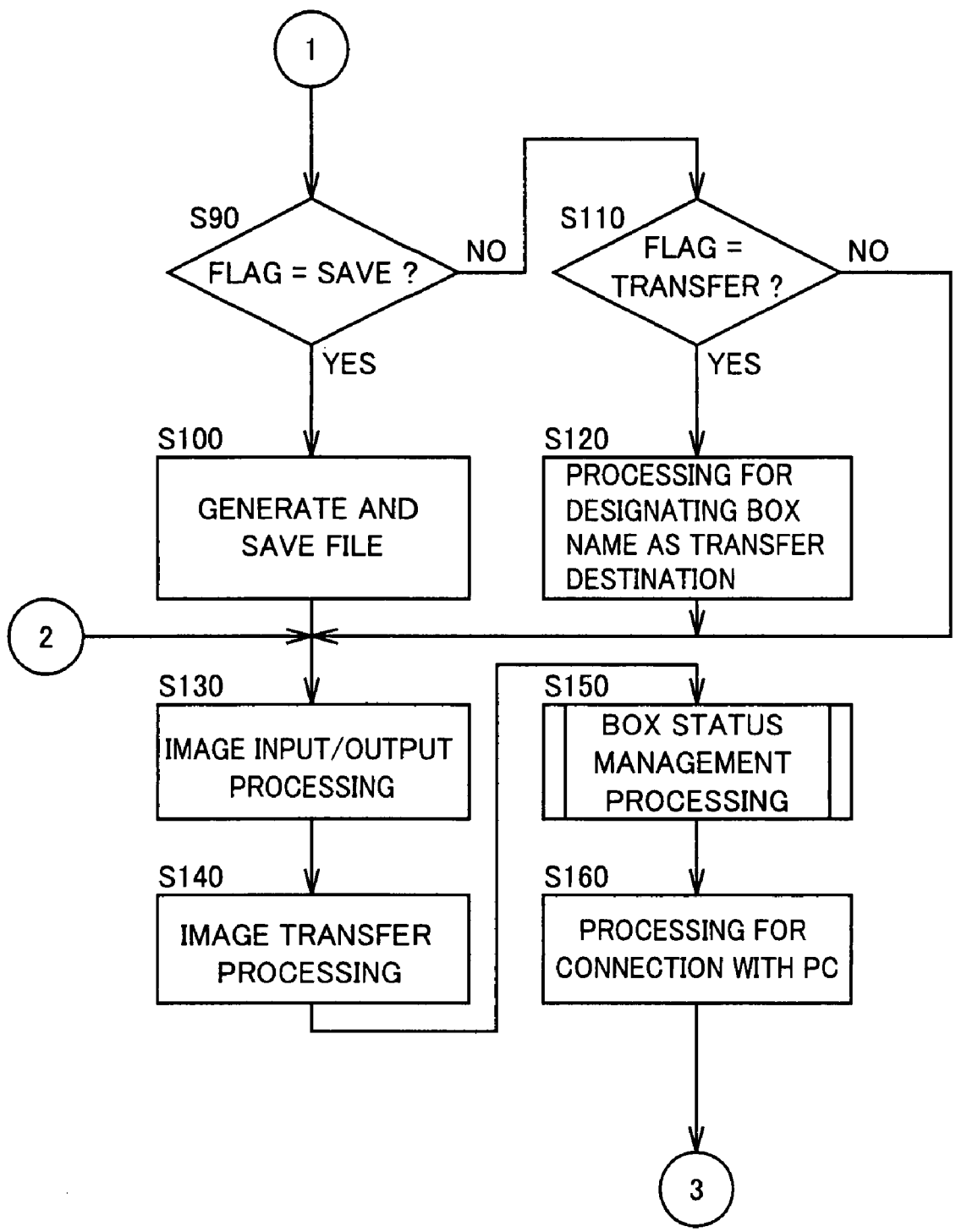

FIGS. 6-7 show the flowcharts of the processing for data saving in the box, transfer and deletion executed in image forming apparatus 1. Such processing contents will be described hereinafter further with reference to the flowcharts. It is noted that the program for performing each processing in the flowcharts is stored in ROM 22, hard disk 23H, or the like. As a result of control by CPU 20 of each unit in image forming apparatus 1 in accordance with the program, each operation in the flowcharts is performed. It is noted that the image processing apparatus according to the present invention may be constituted of a dedicated LSI (Large Scale Integration) performing each processing.

Figure 8:
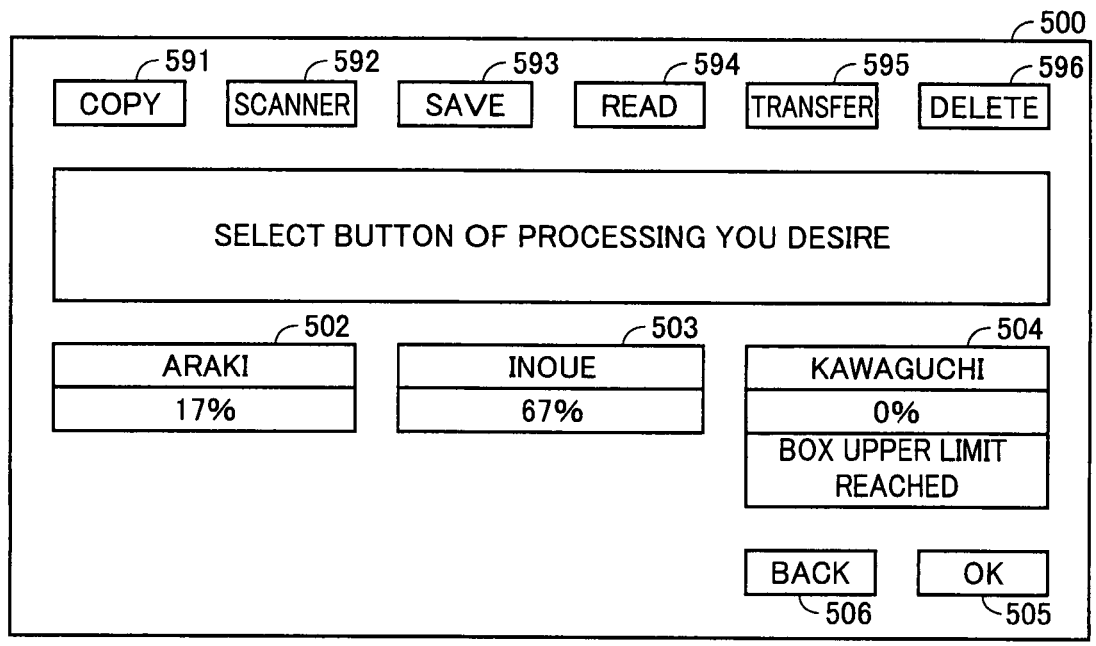
FIG. 8 illustrates an example of an initial menu screen displayed on a display portion of the image forming apparatus in FIG. 2.

Initially referring to FIG. 6, first in step S10, CPU 20 displays an initial menu screen as shown in FIG. 8 on display portion 12, and the process proceeds to step S20. It is noted that an initial menu screen 500 shown in FIG. 8 is a screen displayed on display portion 12 when image forming apparatus 1 is not directly operated by the user.

Initial menu screen 500 shows a copy button 591, a scanner button 592, a save button 593, a read button 594, a transfer button 595, a delete button 596, an OK button 505, and a back button 506. In addition, in remaining amount display fields 502 to 504 in initial menu screen 500, the remaining amount of the storage capacity of the box for each user, the box being defined in hard disk 23H of image forming apparatus 1, is shown. A method of calculating the remaining amount of the storage capacity of each box will be described later.

If copy button 591, scanner button 592 or read button 594 is operated in initial menu screen 500, determination as NO is made in step S20 to step S40 in FIG. 6, and the process proceeds to step S50. It is noted that, in step S20, whether or not save button 593 has been operated in initial menu screen 500 is determined. In addition, in step S30, whether or not transfer button 595 has been operated in that screen is determined. Moreover, in step S40, whether or not delete button 596 has been operated in that screen is determined.

In step S50, CPU 20 displays a screen for designating a condition for processing corresponding to the operated button (hereinafter, referred to as a "processing condition designation screen"), and urges the user to input such a condition. When the condition is input, job generation unit 101 generates a job for performing the processing corresponding to the key operated in initial menu screen 500 based on the condition, and registers the job in active job DB 204. Job execution control unit 102 controls each unit so that the job is executed when its turn comes.

For example, if copy button 591 is operated, CPU 20 controls display portion 12 such that the processing condition designation screen for designating the condition, such as one-side/two-side or full-color/monochrome, is displayed. Job generation unit 101 generates a job for performing copy under the designated condition, and registers the job in active job DB 204. Then, job execution control unit 102 controls scanner portion 13 or the like so that scanner portion 13 reads the image of the document set on document feeder 17 under the condition designated by the user when the turn to execute the job comes, and controls printer portion 14 so that the image is printed on the recording sheet.

If scanner button 592 is operated, CPU 20 displays the processing condition designation screen for designating the condition, such as image quality and density in reading, whether the document is two-sided or not, a format in converting the data of the read image into a file (TIFF or PDF), a transmission destination of the converted file, and the like. Then, as in the case of copying above, the job is registered in active job DB 204, and CPU 20 controls scanner portion 13 or the like such that, when its turn comes, the image of the document set on document feeder 17 is read under the condition designated by the user and the file of the image is created, and CPU 20 controls communication interface 16 so as to transmit the file to the designated destination.

It is noted that the user may use PC 31 to cause image forming apparatus 1 to perform printing processing through remote control. For example, the user opens the image file he/she wants to print on PC 31, designates the printing condition, and thereafter inputs a prescribed command into PC 31. Then, the data for printing the image file is transmitted from PC 31 to image forming apparatus 1, along with the information indicating the printing condition. When this data is received by image forming apparatus 1, job generation unit 101 registers the job of the printing processing in active job DB 204 as in the case of copying above, and when its turn comes, printer portion 14 or the like performs the printing processing.

Referring back to FIG. 6, if the user operates any of copy button 591 and scanner button 592 in initial menu screen 500 and also operates save button 593 (for example, when transfer button 595 is operated within prescribed seconds after operation of copy button 591 or scanner button 592), the process proceeds from step S20 to step S60. Then, in order to perform the processing corresponding to the selected button, BOX control processing unit 104 in FIG. 5 saves the image data in the box owned by the corresponding user (the user of which user name is displayed in a user name display field 512) under the designated file name (the file name input in a file name input field 513). The processing for saving the image data in such a manner will be described hereinafter.

When save button 593 is operated, the process proceeds to step S60.

In step S60, CPU 20 sets a value "save" in a flag (hereinafter, referred to as the "processing flag") for indicating a status (type) of processing to be performed from now. Then, in step S80, CPU 20 performs the processing for designating the file name of the file to be saved and the box where the file should be saved, and the process proceeds to step S90.

Figure 9:
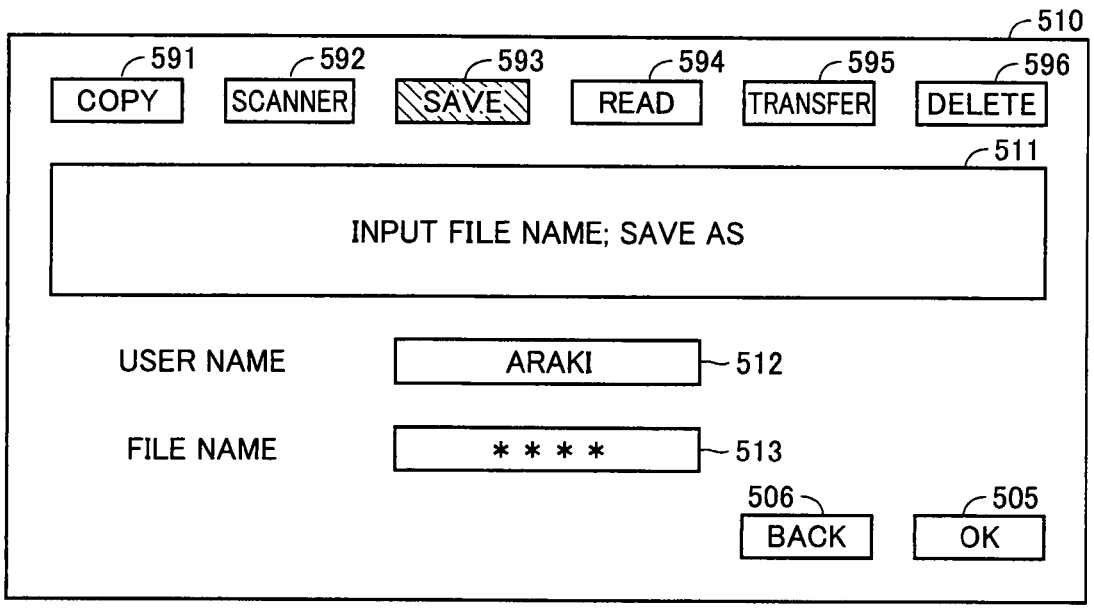
FIG. 9 illustrates an example of a file name input screen displayed on the display portion of the image forming apparatus in FIG. 2.

FIG. 9 shows an example of the screen displayed on display portion 12 when save button 593 is operated, and more specifically, shows an example of the file name input screen.

Referring to FIG. 9, in a file name input screen 510, save button 593 is highlighted. In addition, a message "input file name; save as" is displayed in a message display field 511. Moreover, in file name input screen 510, user name display field 512 is displayed. In user name display field 512, the user name who is performing the operation is displayed. It is noted that image forming apparatus 1 requests the user to log in at the time of start of the operation. Then, image forming apparatus 1 specifies the user name to be displayed in user name display field 512, based on the information input at the time of log-in. Further, in file name input screen 510, file name input filed 513 for input of the file name associated with the image data to be stored from now in the box owned by the user of which user name is displayed in user name display field 512 is shown.

Referring to FIG. 7, in step S90, CPU 20 determines whether or not the value "save" is set in the save flag. If it is determined that the value "save" is set, the process proceeds to step S100. Otherwise, the process proceeds to step S110.

In step S100, CPU 20 performs the processing for creating and saving the file (image data). At this time point, CPU 20 reads the retention period in the target box from BOX information DB (see Table 2), and performs initial registration of a time of deletion in link management information DB (see Table 3) as to the image data to be saved now, based on relation with the current time.

It is noted that, when back button 506 is operated in each screen shown in FIGS. 8 and 9 and in each screen shown in each figure which will be referred to hereinafter in the specification, initial menu screen 500 is again displayed. Thus, the user can start the operation, such as selection as to each item, again from the beginning.

In addition, the user can save image data, for example, created in PC 31 (image data processed, for example created, in an apparatus other than image forming apparatus 1), or a file to be printed in image forming apparatus 1, in the box he/she owns. In such a case, the user selects in advance an option corresponding to save button 593 in initial menu screen 500, at the time of input of a command for printing processing. Then, BOX control processing unit 104 converts print data or the like transmitted from PC 31 to a file, and saves the file in the box owned by the user.

When the user finishes use of image forming apparatus 1, the user performs a prescribed operation and logs out of image forming apparatus 1. Alternatively, forced log-out may be possible, if a state where no operation is made continues for a prescribed time period or longer.

It is noted that a program for transmitting to PC 31 image data of a screen equivalent to each screen displayed on display portion 12 and a program for receiving from PC 31 information input in these screens are installed in image forming apparatus 1. Accordingly, the user can read the image saved in the box through remote control from his/her own PC 31 and causes image forming apparatus 1 to perform desired processing. In addition, display of a memory remaining amount for each BOX can be attained also from PC 31, as in the case of using the operation panel.

Figure 10:
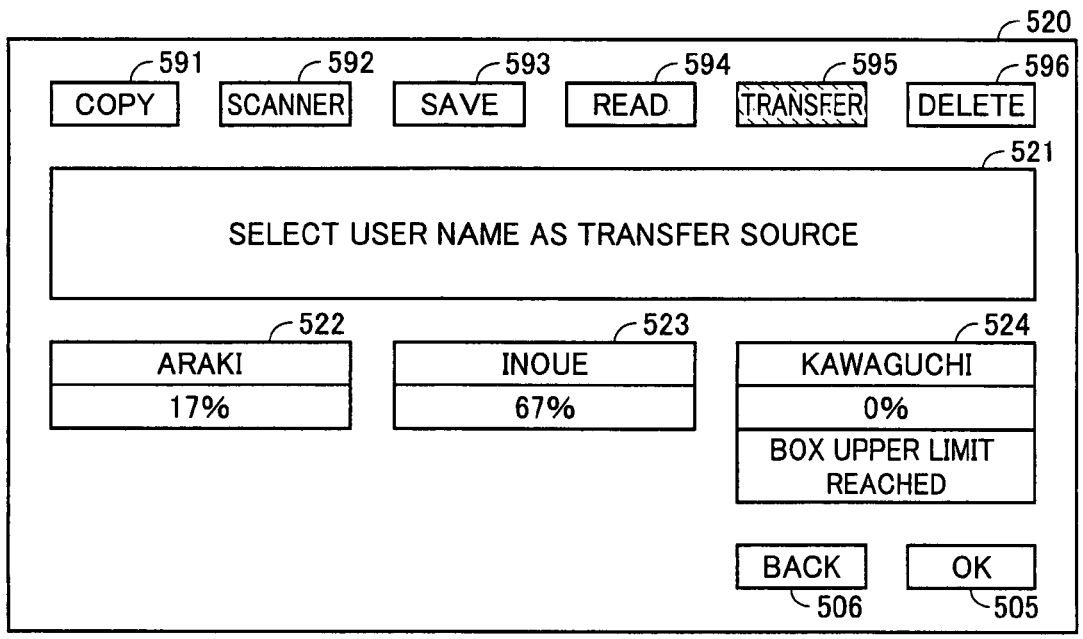
FIGS. 10-12 illustrate examples of a screen displayed on the display portion during execution of transfer processing in the image forming apparatus in FIG. 2.
Figure 11:
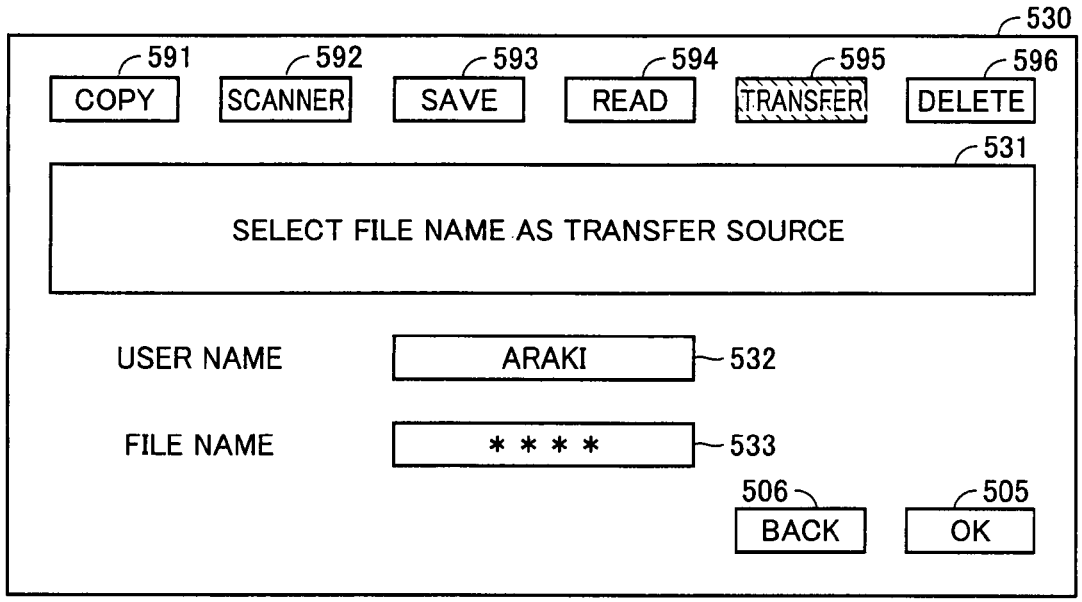
Figure 12:
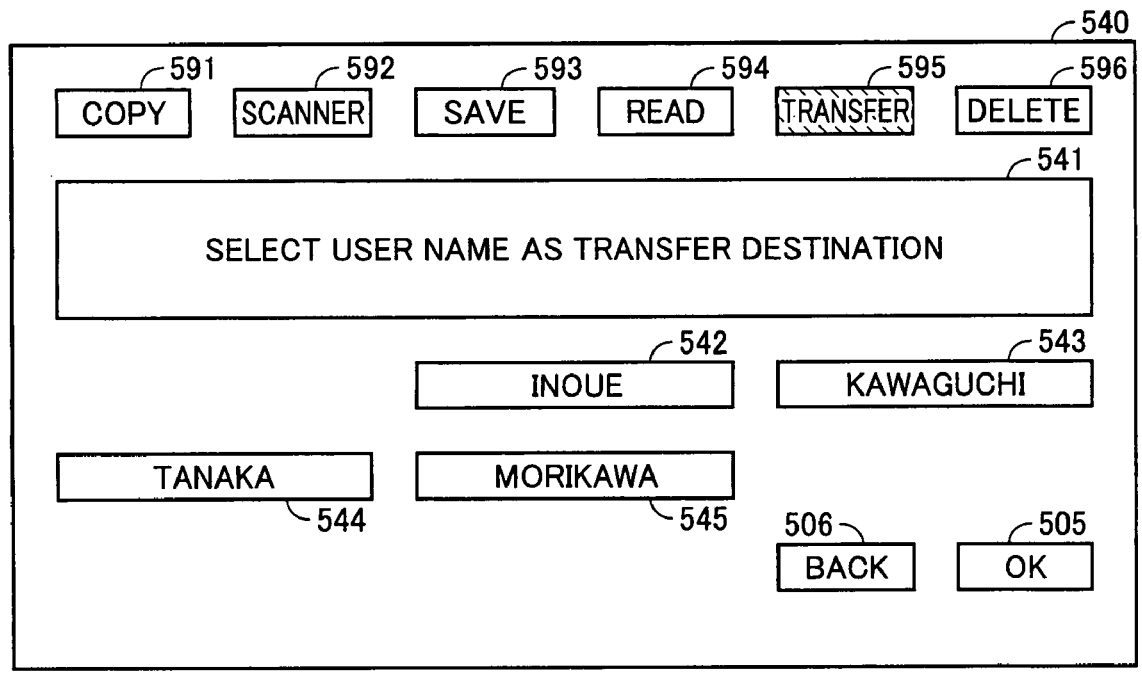

If the user operates copy button 591 or scanner button 592 in initial menu screen 500 and the user also operates transfer button 595, the process proceeds from step S30 to step S70. In step S70, CPU 20 sets the value of the processing flag to "transfer", and in step S80 or in the step that follows, the processing for transferring the image data generated by copying or scanning to another image forming apparatus 1 or PC 31 is performed. FIGS. 10 to 12 illustrate examples of the screen displayed on display portion 12 during execution of such processing for transfer, where designation of the user name as a transfer source, designation of the file name as the transfer source, and designation of the transfer destination (receiver) is successively performed.

In step S80, CPU 20 performs processing for designating the file name of the image data as the transfer source at the time of transfer and the box where the image data is saved, and the process proceeds to step S90.

FIG. 10 shows a screen 520 displayed for designation of a box as the transfer source where the image data is saved. In screen 520, a message "select the user name as the transfer source" is displayed in a message display field 521, and respective ones of all user names registered in user information DB (see Table 1) are shown in box name display fields 522 to 524. The user performs an operation for any one of box name display fields 522 to 524, so as to designate the box as the transfer source (the box where the image data to be transferred from now is stored).

FIG. 11 shows a screen 530 displayed for designation of a file name of the image data as the transfer source (the image data to be transferred from now). In screen 530, a message "select the file name as the transfer source" is displayed in a message display field 531, along with a user name display field 532 and a file name input field 533. In user name display field 532, the user name selected in screen 520 is displayed. The user can input the file name as the transfer source in file name input field 533. It is noted that image forming apparatus 1 may be configured such that a pull-down menu is displayed separately from file name input field 533, file names (FILE ID) of all image data stored in the box corresponding to the user name displayed in user name display field 532 being displayed in the pull-down menu, and selection from the pull-down menu is made so that the file name can be input in file name input field 533.

After the processing in step S80, CPU 20 checks the value of the processing flag in step 590 and step S110. If the value of the flag is set to "transfer", the process proceeds to step S120.

In step S120, CPU 20 performs the processing for designating the box name as the transfer destination. Here, a screen 540 is displayed on display portion 12.

In screen 540, a message "select the user name as the transfer destination" is displayed in a message display field 541, and box name display fields 542 to 545 corresponding to respective ones of all user names registered in user information DB (see Table 1) are displayed. The user operates any of box name display fields 542 to 545 to designate the box as the transfer destination.

In step S130, CPU 20 controls image input/output. Control of image input/output refers to control for image input through scanner portion 13 and communication interface 16 and image output through printer portion 14 and communication interface 16.

In step S140, CPU 20 performs the processing for transferring the file designated as the transfer source at the time when the transfer processing is selected (when the value of the processing flag is set to "transfer") from the BOX designated as the transfer source to the BOX designated as the transfer destination, and thereafter the process proceeds to step S150. In the present embodiment, in transferring the image data (file), the image file itself (image data) is not moved but the link information thereof is utilized. Specifically, as shown in FIG. 4, for example, if the image data provided with a prescribed FILE ID in BOX A2 is designated as the file as the transfer source and BOX B2 is designated as the transfer destination, it is not that the image data itself provided with the prescribed FILE ID is stored in BOX B2 but that link information of the image data provided with the prescribed FILE ID is stored. In addition, the image data provided with the prescribed FILE ID is not deleted from BOX A2. Thus, as in the case of the image data shown as FILE ID "4" in Table 3, information stored in link management information DB (see Table 3) is updated, for example, as the storage location of the image data itself being BOX A2 and a linked location (the BOX storing the link information) being BOX B2.

In addition, when such processing is performed, the retention period of BOX B2 serving as the transfer destination at this time point is read from BOX information DB in Table 2. Then, in link management information DB, only if the time of deletion specified by the read retention period is later than the time of deletion currently provided to the image data provided with the prescribed FILE ID, the time of deletion of the image data provided with the prescribed FILE ID is updated to the time of deletion specified by the retention period of the BOX as the transfer destination (here, BOX B2).

In step S140, CPU 20 transmits updated link management information DB to all image forming apparatuses 1 connected to communication line 4 in file share system FS.

In image forming apparatus 1, as link management information DB is updated also when deletion processing which will be described later is performed, link management information DB is transmitted also when the deletion processing is performed.

Figure 13:
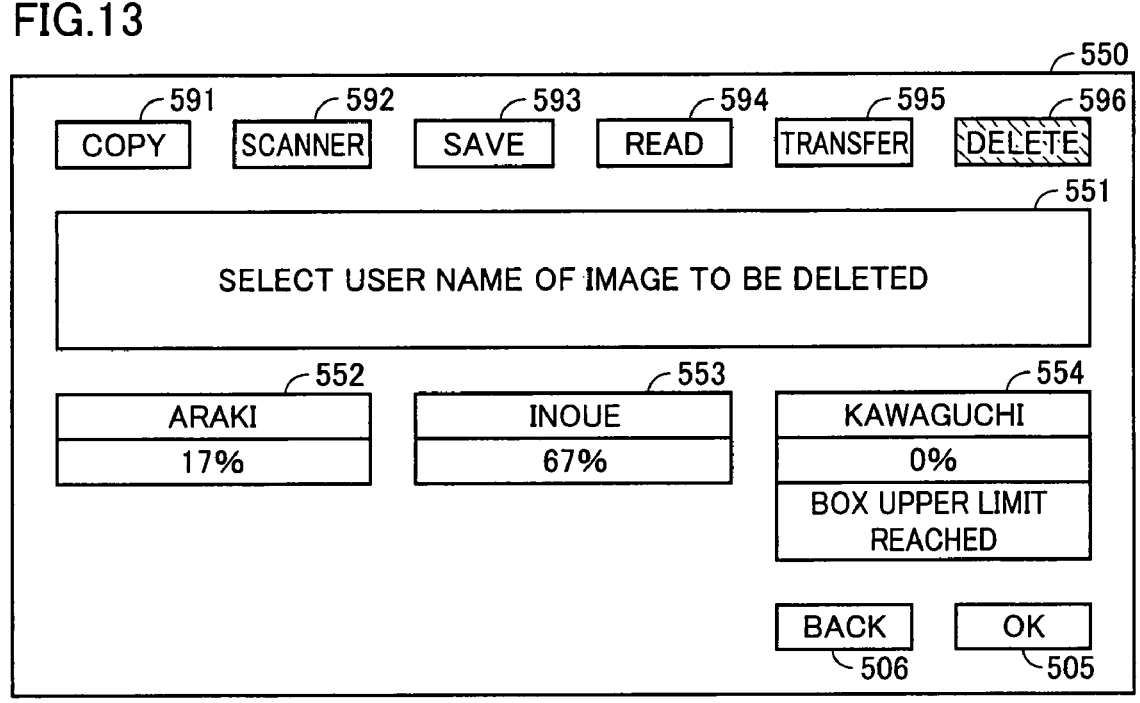
FIGS. 13 and 14 illustrate examples of a screen displayed on the display portion during execution of processing for deleting image data in the image forming apparatus in FIG. 2.
Figure 14:
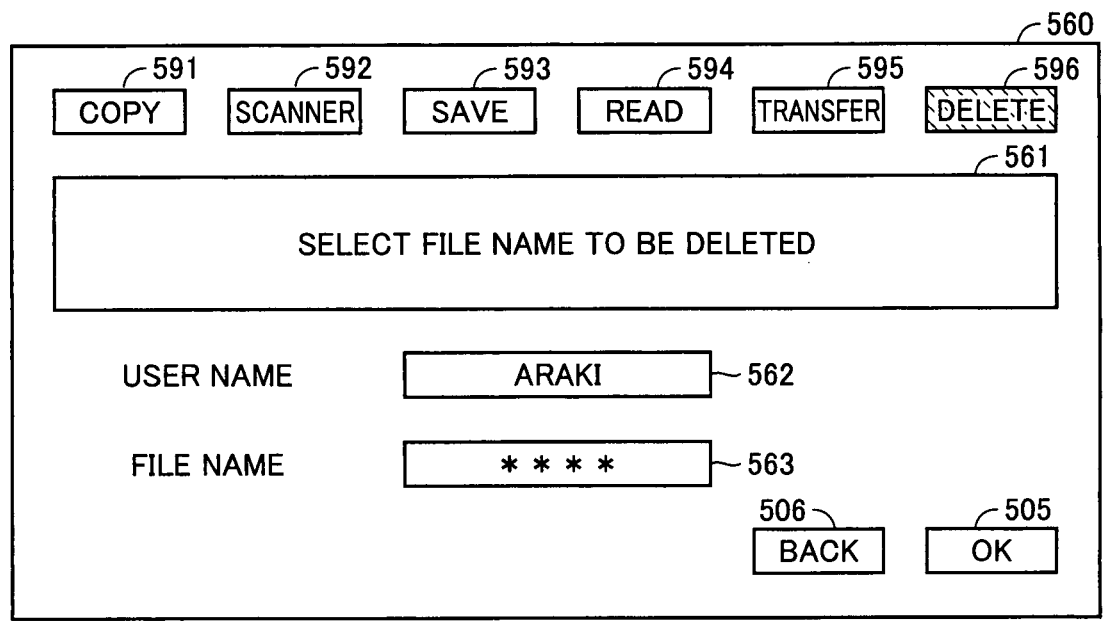

FIGS. 13 and 14 illustrate a screen displayed on display portion 12 of image forming apparatus 1 performing the processing for deleting the image data.

Referring back to FIG. 6, when delete button 596 is operated in initial menu screen 500, the process proceeds from step S40 to step S80.

In this case, in step S80, CPU 20 displays a screen 550 shown in FIG. 13 on display portion 12 and accepts input of information for designating the BOX (user name) where the image data to be deleted is stored, and thereafter displays a screen 560 shown in FIG. 14 on display portion 12 and accepts input of information for designating the file name of the image data to be deleted.

Referring to FIG. 13, in screen 550, a message "select the user name of the image to be deleted" is displayed in a message display field 551, and the user names of the users who own the BOX in hard disk 23H of image forming apparatus 1 are displayed in respective box name display fields 552 to 554. The user performs an operation for any of box name display fields 552 to 554 so as to designate the box storing the image data to be deleted.

Referring to FIG. 14, in screen 560, a message "select the file name to be deleted" is displayed in a message display field 561, along with a user name display field 562 and a file name input field 563. In user name display field 562, the user name selected in screen 550 is displayed. The user can input the file name as the transfer source in file name input field 563. It is noted that image forming apparatus 1 may be configured such that a pull-down menu is displayed separately from file name input field 563, file names (FILE ID) of all image data stored in the box corresponding to the user name displayed in user name display field 562 being displayed in the pull-down menu, and selection from the pull-down menu is made so that the file name can be input in file name input field 563.

When delete button 596 is operated, CPU 20 performs the processing for deleting the designated image data in step S130, and thereafter the process proceeds to step S150. Here, CPU 20 refers to link management information DB before deletion of image data, and checks the "linked location" of the designated image data. Then, if the information of a BOX other than the BOX storing the image data is not stored in this field, the image data is deleted from hard disk 23H. Meanwhile, if the information of a BOX other than the BOX storing the image data is stored in this field, the image data is not deleted but only update of BOX information DB is performed. Specifically, CPU 20 updates BOX information DB such that, in the BOX storing the image data, the FILE ID corresponding to the image data is moved from "valid image FILE ID" to "invalid image FILE ID."

In step S150, CPU 20 performs BOX status management processing. The BOX status management processing refers to processing for calculating a memory remaining amount, in order to display a remaining amount of the storage capacity (memory remaining amount) of the BOX for each user as shown in FIGS. 8, 10 and 13.

The "memory remaining amount" herein refers to a ratio of a value (a virtual remaining amount), which is calculated by subtracting the total sum of the image size of all "valid image FILE IDs" from the value of the "upper limit" of the corresponding BOX number by referring to BOX information DB and link information management DB, to the "upper limit".

For example, in the case of BOX A1, the "upper limit" is 1200 MB, and the sum of the image size of valid image FILE IDs ("1" and "2") is calculated as 1000 MB (200+800) by referring to link information DB. Therefore, the virtual remaining amount is 200 MB. Thus, the memory remaining amount representing the ratio of the virtual remaining amount to the "upper limit" is calculated as 17% (200/12000*100).

In addition, in the case of BOX B1, the "upper limit" is 1200 MB, and the image size of valid image FILE ID ("1") is 200 MB, although the image of valid FILE ID 1 is managed by using the link information and the image file itself is not present in BOX B1. Therefore, the virtual remaining amount is 1000 MB. Thus, the memory remaining amount representing the ratio of the virtual remaining amount to the "upper limit" is calculated as 83% (1000/1200*100).

Moreover, in the case of BOX B3, no image data is stored but the link information of FILE IDs "5" to "10" is stored. Here, the sum of the image size of FILE IDs "5" to "10" is assumed as 1200 MB. Then, the image size of the valid FILE ID of BOX B3 is 1200 MB, and the virtual remaining amount is 0 MB. Thus, the memory remaining amount representing the ratio of the virtual remaining amount to the "upper limit" is calculated as 0%.

In the present embodiment, as shown in FIG. 8 or the like, a remaining amount with regard to all user names (BOX) is displayed, however, the remaining amount only with regard to the BOX of which remaining amount is 0% may be displayed, from a viewpoint of management of upper limit of the storage capacity of each BOX.

Thus, in image forming apparatus 1, in addition to the processing for directly handling the image data or link information thereof such as copying, the processing such as charging in accordance with the used amount of the storage area, upper limit management, update of various databases, and the like can be performed for each BOX.

For example, CPU 20 checks the remaining amount of the storage capacity of the BOX ("displayed remaining amount" above), for example at a prescribed time every day, in accordance with the used amount of the area in the BOX the user owns, accumulates the remaining amount to calculate the average used amount of each BOX for each month, and charges each user. In the present embodiment, like the "charge rank" registered in BOX information management DB, referring to the total sum of the capacity of the image data in the field of valid image FILE ID, the sum 0 to 500 MB is identified as rank 1, the sum 500 MB to 1000 MB is identified as rank 2, and the charged amount is determined depending on the rank. The rank with regard to charging is determined by summation at a prescribed time every day as described above for finding the average of daily charge rank for each month. Then, a manager bills the user for the usage fee of the HDD, in accordance with the charge rank. The charge information can readily be obtained by allowing only the manager to perform a special operation on the operation panel to display the contents in BOX information DB described previously on the operation panel.

Figure 15:
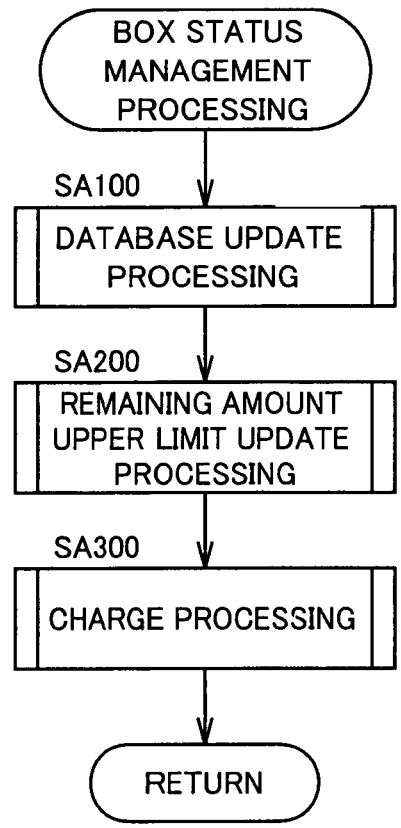
FIG. 15 is a flowchart of a sub routine of a BOX status management processing in FIG. 7.

FIG. 15 shows a flowchart of a sub routine of the BOX status management processing including the processing for such charging. In the BOX status management processing, CPU 20 calls database update processing (step SA100), remaining amount upper limit update processing (step SA200) and a sub routine of charge processing (step SA300), sequentially in this order.

Figure 16:
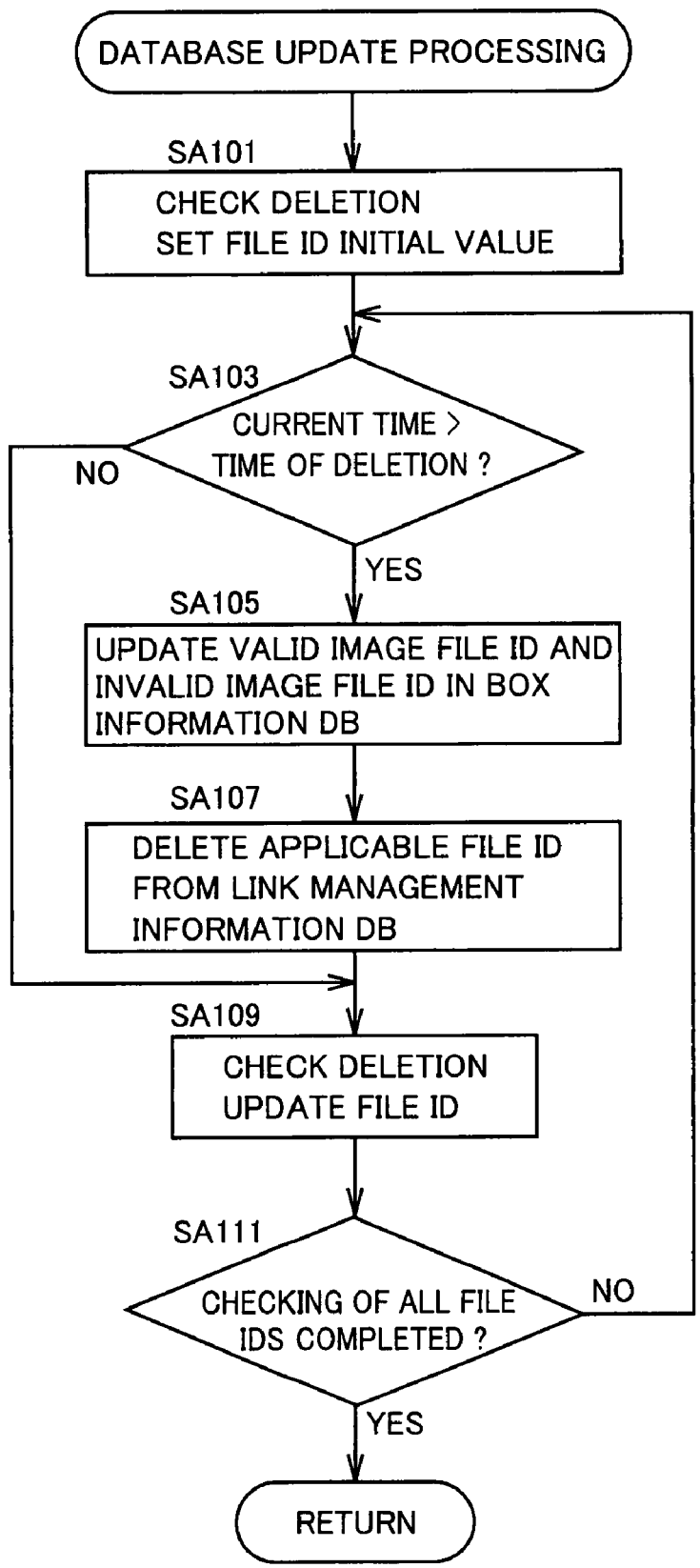
FIG. 16 is a flowchart of a sub routine of database update processing in FIG. 15.

FIG. 16 is a flowchart of the database update processing.

In this processing, initially in step SA101, CPU 20 sets the FILE ID to be processed from now, from among FILE IDs of which information has been registered in link management information DB, to the initial value, and the process proceeds to step SA103.

Thereafter, CPU 20 compares the current time with the time of deletion of the FILE ID to be processed in step SA103. Then, if it is determined that the current time has reached the time of deletion, CPU 20 updates BOX information DB in step SA105 so that the FILE ID is deleted from the field of valid image FILE ID and invalid image FILE ID, updates link management information DB in step SA107 so as to delete the FILE ID, and the process proceeds to step SA109. If it is determined in step SA103 that there is no FILE ID of which time of deletion has not been reached as of the current time, the process proceeds to step SA109.

In step SA109, CPU 20 updates the FILE ID to be processed to a next value (registered in link management information DB), and the process proceeds to step SA111.

In step SA111, whether the processing in step SA103 for all FILE IDs, of which information has been registered in link management information DB, has completed or not is determined. That is, whether the value is updated in step SA109 and the FILE ID to be processed has attained a value not registered in link management information DB is determined. If it is determined as YES, the process returns to the routine shown in FIG. 7, and if it is determined as NO, the process returns to step SA103.

Figure 17:
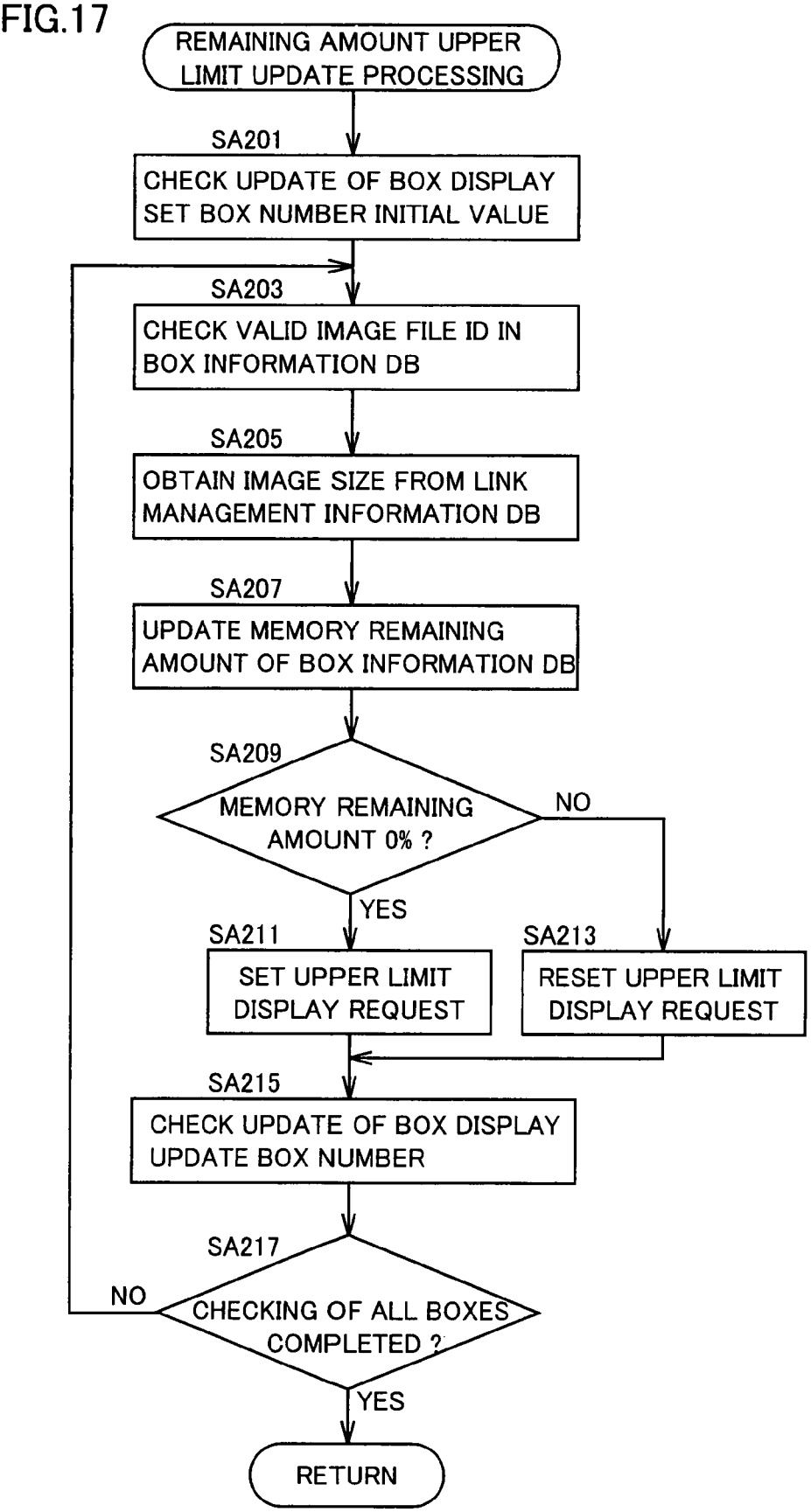
FIG. 17 is a flowchart of a sub routine of a remaining amount upper limit update processing in FIG. 15.

FIG. 17 is a flowchart of the remaining amount upper limit update processing.

In this processing, initially in step SA201, CPU 20 sets the BOX number to be processed to the first BOX number registered in BOX information DB, and the process proceeds to step SA203.

In step SA203, CPU 20 obtains all FILE IDs stored in the field of valid image FILE ID of the BOX to be processed, and the process proceeds to step SA205.

In step SA205, CPU 20 calculates the sum of FILE IDs obtained in step SA205 by referring to link management information DB, and the process proceeds to step SA207.

In step SA207, CPU 20 calculates the memory remaining amount of the BOX to be processed in the above-described manner, updates BOX information DB by rewriting the field of the "memory remaining amount" as to the BOX to be processed with the calculated value, and the process proceeds to step SA209.

In step SA209, CPU 20 determines whether the memory remaining amount of the BOX to be processed has attained to "0%". If the memory remaining amount is determined as 0%, the process proceeds to step SA211, and otherwise, the process proceeds to step SA213.

In step SA211, CPU 20 sets an upper limit display request so that upper limit display is performed. Alternatively, in step SA213, CPU 20 resets the upper limit display request so that upper limit display is not performed. Thus, in remaining amount display shown in FIG. 8 or the like from the viewpoint of upper limit management as described above, remaining amount display is performed only when the memory remaining amount attains to 0%.

After step SA211 and step SA213, CPU 20 updates the BOX number to be processed to the next number in BOX information DB in step SA215, and the process proceeds to step SA217.

In step SA217, CPU 20 determines whether or not the processing in step SA203 has been performed for all BOXes of which information has been registered in BOX information DB. If it is determined as YES, the process returns to the routine shown in FIG. 7, and if it is determined as NO, the process returns to step SA203.

Figure 18:
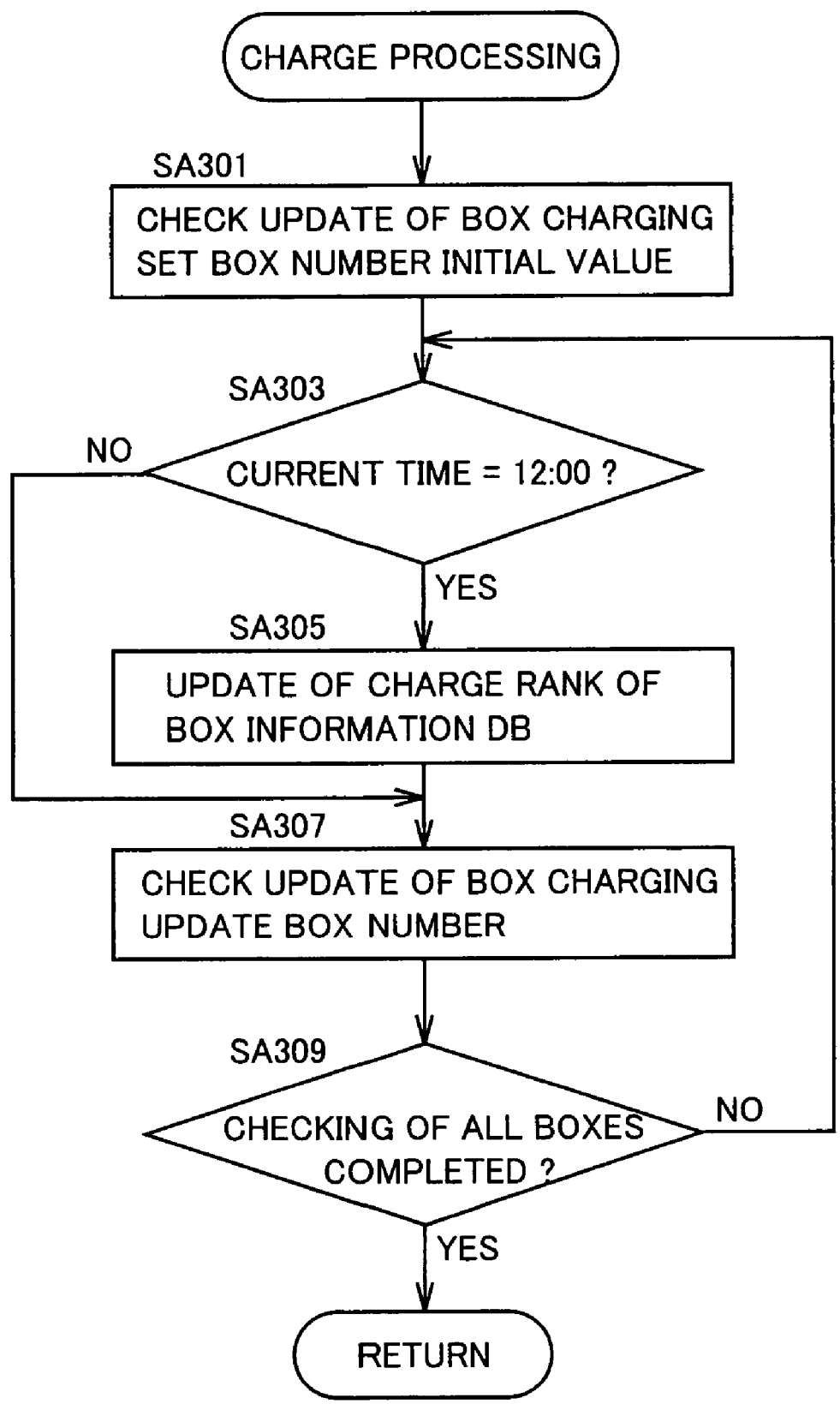
FIG. 18 is a flowchart of a sub routine of charge processing in FIG. 15.

FIG. 18 is a flowchart of the charge processing.

In the charge processing, initially in step SA301, the BOX number to be processed is set to the first BOX number registered in BOX information DB, and the process proceeds to step SA303.

In step SA303, CPU 20 determines whether the current time is twelve o'clock or not. If it is determined as YES, the process proceeds to step SA305, and otherwise, the process proceeds to step SA307.

In step SA305, CPU 20 updates the field of the charge rank of the BOX to be processed in BOX information DB, in accordance with the memory remaining amount at that time point, of the BOX to be processed, and the process proceeds to step SA307.

In step SA307, CPU 20 updates the BOX number to be processed to the next number in BOX information DB, and the process proceeds to step SA309.

In step SA309, CPU 20 determines whether or not the processing in step SA303 has been performed for all BOXes of which information has been registered in BOX information DB. If it is determined as YES, the process returns to the routine shown in FIG. 7, and if it is determined as NO, the process returns to step SA303.

In the charge processing, in order to calculate monthly average of the charge rank, in step SA303, the charge rank for each day is preferably registered in a not-shown database for each BOX.

Referring to FIG. 7, after the BOX status management processing in step S150, CPU 20 performs processing for connection with PC 31 in step S160 and performs the processing for transmitting the screen data of the screen equivalent to each screen displayed on display portion 12 described previously to PC 31. The process returns to step S20, and CPU 20 waits for an operation by the user.

In the present embodiment described above, control of the BOX in one image forming apparatus 1 (assumed as the first MFP) constituting file share system FS has been described, however, control of the BOX in another image forming apparatus 1 (assumed as the second MFP) can also readily be carried out similarly.

For example, in FIG. 4, in the second MFP, not the image data but the link information thereof is stored in BOX B2. If the memory remaining amount calculated based on the link information attains to 0%, display to that effect is given on the operation panel of the second MFP.

In addition, in the image transfer processing in step S140, BOX information DB of the BOX as the transfer destination and additionally link management information DB are updated as appropriate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus calculating a charged amount in accordance with an amount of data storage, comprising:
   a data storage unit storing image data;
   a communication unit communicating with a storage device different from said data storage unit;
   a stored data designation unit designating image data to be stored in said data storage unit;
   a first information storage unit storing information for identifying designated data which is image data designated by said stored data designation unit;
   a second information storage unit storing said information for identifying each said designated data in association with a data amount of the designated data and a storage location of the designated data;
   a storage control unit obtaining information for specifying the data amount of the designated data from said data storage unit and storing that information in said second information storage unit if said designated data is stored in said data storage unit, and obtaining information for specifying the data amount of the designated data from said storage device and storing that information in said second information storage unit if the storage location of said designated data is said storage device;
   a first calculation unit calculating a virtual used capacity based on the data amount of all said designated data of which data amount has been stored in said second information storage unit; and
   a second calculation unit calculating a charged amount for usage of said data storage unit based on the virtual used capacity calculated by said calculation unit.

2. The image processing apparatus according to claim 1, further comprising a moved data designation unit designating image data to be moved to said storage device, among said designated data; wherein
   said storage control unit changes the storage location in said second information storage unit, of the image data designated by said moved data designation unit, to said storage device.

3. The image processing apparatus according to claim 1, further comprising a deleted data designation unit designating image data to be deleted from said data storage unit from among designated data stored in said data storage unit among said designated data; wherein
   said second information storage unit stores information for identifying each said designated data and information for identifying an apparatus storing link information of the image data further in association with each other,
   if the apparatus storing the link information of the image data designated by said deleted data designation unit is said storage device, said storage control unit does not delete the image data designated by said deleted data designation unit from said data storage unit but deletes the information for identifying the image data designated by said deleted data designation unit from said first information storage unit, and
   if the link information of the image data designated by said deleted data designation unit is not stored in said second information storage unit, said storage control unit deletes the image data designated by said deleted data designation unit from said data storage unit and deletes the information for identifying the image data designated by said deleted data designation unit from said first information storage unit.

4. An image processing apparatus, comprising:
   a data storage unit storing image data;
   a communication unit communicating with a storage device different from said data storage unit;
   a stored data designation unit designating image data to be stored in said data storage unit;
   a first information storage unit storing information for identifying designated data which is image data designated by said stored data designation unit;
   a second information storage unit storing said information for identifying each said designated data in association with a data amount of the designated data and an area where the designated data is stored;
   a storage control unit obtaining information for specifying the data amount of the designated data from said data storage unit and storing that information in said second information storage unit if the area where said designated data is stored is said data storage unit, and obtaining information for specifying the data amount of the designated data from said storage device and storing that information in said second information storage unit if the area where said designated data is stored is said storage device;
   a calculation unit calculating a virtual used amount based on the data amount of all said designated data for which information for specifying the data amount has been stored in said second information storage unit; and
   a display unit displaying the virtual used amount calculated by said calculation unit as a used amount of said data storage unit.

5. The image processing apparatus according to claim 4, further comprising a moved data designation unit designating image data to be moved to said storage device, among said designated data; wherein
   said storage control unit changes the area in said second information storage unit, where the image data designated by said moved data designation unit should be stored, to said storage device.

6. The image processing apparatus according to claim 4, further comprising a deleted data designation unit designating image data to be deleted from said data storage unit from among designated data stored in said data storage unit among said designated data; wherein
   said second information storage unit stores information for identifying each said designated data and information for identifying an apparatus storing link information of the image data further in association with each other,
   if the apparatus storing the link information of the image data designated by said deleted data designation unit is said storage device, said storage control unit does not delete the image data designated by said deleted data designation unit from said data storage unit but deletes the information for-identifying the image data designated by said deleted data designation unit from said first information storage unit, and
   if the link information of the image data designated by said deleted data designation unit is not stored in said second information storage unit, said storage control unit deletes the image data designated by said deleted data designation unit from said data storage unit and deletes the information for identifying the image data designated by said deleted data designation unit from said first information storage unit.

7. An image processing apparatus performing management of upper limit of a storage capacity of data, comprising:
a data storage unit storing image data;
a communication unit communicating with a storage device different from said data storage unit;
a stored data designation unit designating image data to be stored in said data storage unit;
a first information storage unit storing information for identifying designated data which is image data designated by said stored data designation unit;
a second information storage unit storing said information for identifying each said designated data in association with a data amount of the designated data and a storage location of the designated data;
a storage control unit obtaining information for specifying the data amount of the designated data from said data storage unit and storing that information in said second information storage unit if the storage location of said designated data is said data storage unit, and obtaining information for specifying the data amount of the designated data from said storage device and storing that information in said second information storage unit if the storage location of said designated data is said storage device;
a first calculation unit calculating a virtual used capacity of said data storage unit based on the data amount of all said designated data of which data amount has been stored in said second information storage unit;
a second calculation unit calculating a difference between a capacity and said virtual used capacity of said data storage unit; and
a display unit displaying the difference in capacity calculated by said second calculation unit as a remaining amount of the storage capacity of said data storage unit.

8. The image processing apparatus according to claim 7, further comprising a moved data designation unit designating image data to be moved to said storage device, among said designated data; wherein
said storage control unit changes the storage location in said second information storage unit, of the image data designated by said moved data designation unit, to said storage device.

9. The image processing apparatus according to claim 7, further comprising a deleted data designation unit designating image data to be deleted from said data storage unit from among designated data stored in said data storage unit among said designated data; wherein
said second information storage unit stores information for identifying each said designated data and information for identifying an apparatus storing link information of the image data further in association with each other,
if the apparatus storing the link information of the image data designated by said deleted data designation unit is said storage device, said storage control unit does not delete the image data designated by said deleted data designation unit from said data storage unit but deletes the information for identifying the image data designated by said deleted data designation unit from said first information storage unit, and
if the link information of the image data designated by said deleted data designation unit is not stored in said second information storage unit, said storage control unit deletes the image data designated by said deleted data designation unit from said data storage unit and deletes the information for identifying the image data designated by said deleted data designation unit from said first information storage unit.

10. An image processing system comprising an image processing apparatus including a data storage unit storing image data;
said image processing apparatus including
a first information storage unit storing information for identifying the image data,
a second information storage unit storing information for identifying the image data stored in said data storage unit and information for identifying a storage device other than said data storage unit for storing link information of the image data, in association with each other,
a designation unit designating deletion of the image data stored in said data storage unit, and
a storage control unit that, if said designation unit designates deletion of the image data, deletes the information for identifying the designated image data from said first information storage unit without deleting the image data from said data storage unit when the information for identifying said storage device with regard to said designated image data is stored in said second information storage unit, and deletes the image data from said data storage unit and deletes the information for identifying the designated image data from said first information storage unit when the information for identifying said storage device with regard to said designated image data is not stored in said second information storage unit.

11. The image processing system according to claim 10, wherein
at least one of said data storage unit and said storage device stores a retention period of certain image data stored in said data storage unit, for which identification information has been stored in said first information storage unit,
said image processing apparatus further comprises a detection unit detecting a latest retention time limit among all retention time limits stored in said data storage unit and said storage device with regard to said certain image data, and
said storage control unit deletes the image data designated by said designation unit from said data storage unit, on condition that the retention time limit detected by said detection unit has come.

12. A method of controlling an image processing apparatus including a data storage unit storing image data and communicating with a storage device different from the data storage unit, comprising the steps of:
designating image data to be stored in said data storage unit;
storing information for identifying designated data which is designated image data;
storing said information for identifying each said designated data in association with an amount of data of the designated data and an area where the designated data is stored;
detecting an area where said designated data is stored;
obtaining information for specifying the data amount of the designated data from said data storage unit and storing that information if said area where said designated data is stored is said data storage unit, and obtaining information for specifying the data amount of the designated data from said storage device and storing that information if said area where said designated data is stored is said storage device;

calculating a virtual used amount based on the data amount of all said designated data for which the information for specifying the data amount has been stored; and displaying said calculated virtual used amount as a used amount of said data storage unit.

13. The method of controlling an image processing apparatus according to claim 12, further comprising the steps of:

designating image data to be moved to said storage device, among said designated data; and changing the area, where the image data designated to be moved to said storage device should be stored, to said storage device.

14. The method of controlling an image processing apparatus according to claim 12, further comprising the steps of:

designating image data to be deleted from said data storage unit from among designated data stored in said data storage unit among said designated data;

storing information for identifying each said designated data and information for identifying an apparatus storing link information of the image data in association with each other;

determining whether the apparatus storing the link information of said designated image data is said storage device;

deleting the information for identifying said designated image data without deleting said designated image data from said data storage unit if the apparatus storing the link information of said designated image data is said storage device;

determining whether the link information of said designated image data is stored in the step of storing information for identifying each said designated data and information for identifying an apparatus storing link information of the image data in association with each other; and deleting said designated image data from said data storage unit and deleting the information stored in the step of storing information for identifying said designated data, if the link information of said designated image data is not stored.

15. A method of controlling an image processing apparatus including a data storage unit storing image data, communicating with a storage device different from said data storage unit, and calculating a charged amount in accordance with an amount of data storage, comprising the steps of:

designating image data to be stored in said data storage unit;

storing information for identifying designated data which is designated said image data;

storing the information for identifying each said designated data in association with a data amount of the designated data and a storage location of the designated data;

determining an area where said designated data is stored;

obtaining information for specifying the data amount of the designated data from said data storage unit and storing that information if said designated data is stored in said data storage unit, and obtaining information for specifying the data amount of the designated data from said storage device and storing that information if said designated data is stored in said storage device;

calculating a virtual used capacity based on the data amount of all said designated data of which data amount has been stored; and calculating a charged amount for usage of said data storage unit based on said calculated virtual used capacity.

16. The method of controlling an image processing apparatus according to claim 15, further comprising the steps of:

designating image data to be moved to said storage device, among said designated data; and changing the area, where said image data designated to be moved should be stored, to said storage device.

17. The method of controlling an image processing apparatus according to claim 15, further comprising the steps of:

designating image data to be deleted from said data storage unit from among designated data stored in said data storage unit among said designated data;

storing information for identifying each said designated data and information for identifying an apparatus storing link information of the image data in association with each other;

determining whether the apparatus storing the link information of said designated image data is said storage device;

deleting the information for identifying said designated image data without deleting said designated image data from said data storage unit if the apparatus storing the link information of said designated image data is said storage device;

determining whether the link information of said designated image data is stored in the step of storing information for identifying each said designated data and information for identifying an apparatus storing link information of the image data in association with each other; and deleting said designated image data from said data storage unit and deleting the information stored in the step of storing information for identifying said designated data if the link information of said designated image data is not stored.

18. A method of controlling an image processing apparatus including a data storage unit storing image data, communicating with a storage device different from said data storage unit, and performing management of upper limit of a storage capacity of data, comprising the steps of:

designating image data to be stored in said data storage unit;

storing information for identifying designated data which is designated said image data;

storing the information for identifying each said designated data in association with a data amount of the designated data and a storage location of the designated data;

detecting an area where said designated data is stored;

obtaining information for specifying the data amount of the designated data from said data storage unit and storing that information if the area where said designated data is stored is said data storage unit, and obtaining information for specifying the data amount of the designated data from said storage device and storing that information if the area where said designated data is stored is said storage device;

calculating a virtual used capacity of said data storage unit based on the data amount of all said designated data of which data amount has been stored;

calculating a difference between a capacity and said virtual used capacity of said data storage unit; and displaying said calculated difference in capacity as a remaining amount of the storage capacity of said data storage unit.

19. The method of controlling an image processing apparatus according to claim 18, further comprising the steps of:
designating image data to be moved to said storage device, among said designated data; and
changing the area, where said image data designated to be moved should be stored, to said storage device.

20. The method of controlling an image processing apparatus according to claim 18, further comprising the steps of
designating image data to be deleted from said data storage unit from among designated data stored in said data storage unit among said designated data;
storing information for identifying each said designated data and information for identifying an apparatus storing link information of the image data in association with each other;
determining whether the apparatus storing the link information of said designated image data is said storage device;
deleting the information for identifying said designated image data without deleting said designated image data from said data storage unit if the apparatus storing the link information of said designated image-data is said storage device;
determining whether the link information of said designated image data is stored in the step of storing information for identifying each said designated data and information for identifying an apparatus storing link information of the image data in association with each other; and
deleting said designated image data from said data storage unit and deleting the information stored in the step of storing information for identifying said designated data if the link information of said designated image data is not stored.

* * * * *